(12) United States Patent
Peikert et al.

(10) Patent No.: US 8,312,644 B2
(45) Date of Patent: Nov. 20, 2012

(54) SHOE-REINFORCEMENT MATERIAL AND BARRIER UNIT, COMPOSITE SHOE SOLE, AND FOOTWEAR CONSTITUTED THEREOF

(76) Inventors: Marc Peikert, Wolfratshausen (DE); Thorger Hubner, Flintsbach (DE)

( * ) Notice: Subject to any disclaimer, the term of this patent is extended or adjusted under 35 U.S.C. 154(b) by 1027 days.

(21) Appl. No.: 12/281,510

(22) PCT Filed: Mar. 2, 2007

(86) PCT No.: PCT/EP2007/001819
§ 371 (c)(1),
(2), (4) Date: Nov. 25, 2008

(87) PCT Pub. No.: WO2007/101624
PCT Pub. Date: Sep. 13, 2007

(65) Prior Publication Data
US 2009/0300942 A1 Dec. 10, 2009

(30) Foreign Application Priority Data

| Mar. 3, 2006 | (DE) | 10 2006 009 974 |
| Nov. 29, 2006 | (DE) | 20 2006 018 138 U |
| Jan. 17, 2007 | (DE) | 20 2007 000 668 U |

(51) Int. Cl.
*A43B 13/12* (2006.01)
*A43B 13/18* (2006.01)
*A43B 7/06* (2006.01)
*A43B 13/00* (2006.01)
*A43C 13/08* (2006.01)

(52) U.S. Cl. .................. 36/30 R; 36/3 B; 36/14; 36/103

(58) Field of Classification Search .............. 36/3 B, 36/12, 30 R, 25 R, 103, 14, 73, 4
See application file for complete search history.

(56) References Cited

U.S. PATENT DOCUMENTS

| 4,187,390 A | * | 2/1980 | Gore | 174/102 R |
| 4,493,870 A | * | 1/1985 | Vrouenraets et al. | 442/236 |
| 4,551,378 A | * | 11/1985 | Carey, Jr. | 428/198 |
| 5,714,229 A | * | 2/1998 | Ogden | 428/138 |
| 5,733,826 A | * | 3/1998 | Groitzsch | 442/364 |

(Continued)

FOREIGN PATENT DOCUMENTS

DE 1 922 089 A1 4/1969

(Continued)

*Primary Examiner* — Darnell Jayne
*Assistant Examiner* — Andrew Roersma
(74) *Attorney, Agent, or Firm* — James Arnold, Jr.

(57) ABSTRACT

A shoe-reinforcement material (33) having a fiber combination (1) with a first fiber component (2) and a second fiber portion (4,5) having a second fiber component (3), whereby the first fiber component (2) has a first melting point and a first softening-temperature range lying below it, and a first fiber portion (5) of the second fiber component (3) has a second melting point and a second softening-temperature range lying below it; the first melting point and the first softening-temperature range are higher than the second melting point and the second softening-temperature range, the second fiber portion (4) of the second fiber component (3) has a higher melting point and a higher softening temperature lying above it than the first fiber portion (5), and the fiber combination (1), in consequence of thermal activation of the first fiber portion (5) of the second fiber component (4), attached thermally with an adhesive-softening temperature lying in the second softening-temperature range, with water-vapor permeability retained in the thermally attached region.

50 Claims, 21 Drawing Sheets

U.S. PATENT DOCUMENTS

| | | | | |
|---|---|---|---|---|
| 5,738,937 | A | * | 4/1998 | Baychar .................... 428/316.6 |
| 5,779,847 | A | * | 7/1998 | Groeger .................... 156/308.2 |
| 6,500,538 | B1 | * | 12/2002 | Strack et al. ................. 428/364 |
| 6,508,015 | B1 | * | 1/2003 | Rauch ............................ 36/3 B |
| 6,723,428 | B1 | | 4/2004 | Foss et al. |
| 7,935,645 | B2 | * | 5/2011 | Pourdeyhimi et al. ........ 442/361 |
| 2002/0112379 | A1 | * | 8/2002 | Sussmann et al. ............. 36/128 |
| 2003/0060113 | A1 | | 3/2003 | Christie ....................... 442/364 |
| 2003/0134556 | A1 | | 7/2003 | Christie ....................... 442/327 |
| 2004/0071947 | A1 | | 4/2004 | Hwang et al. ............... 428/292.1 |
| 2005/0160711 | A1 | | 7/2005 | Yang ............................... 55/524 |
| 2005/0229431 | A1 | | 10/2005 | Gerlin ............................... 36/25 |
| 2011/0167678 | A1 | * | 7/2011 | Peikert ........................... 36/3 R |

FOREIGN PATENT DOCUMENTS

| | | |
|---|---|---|
| DE | 2 249 138 A1 | 4/1974 |
| WO | WO 2005/063069 | 7/2005 |
| WO | WO 2005/065479 | 7/2005 |

* cited by examiner

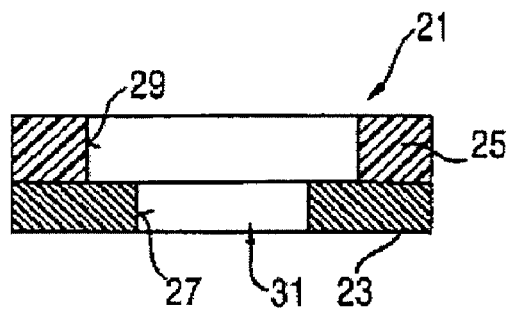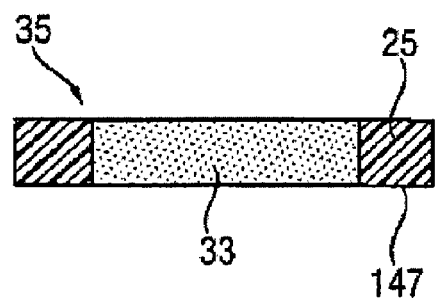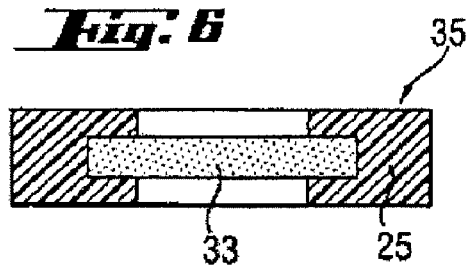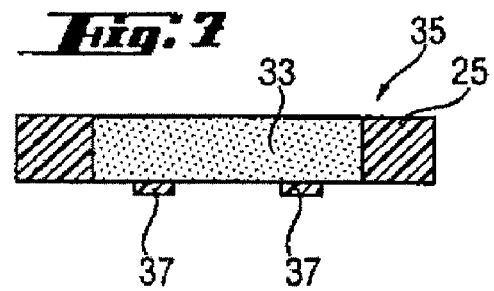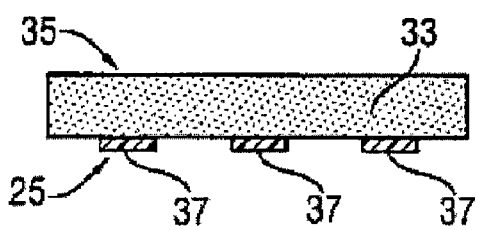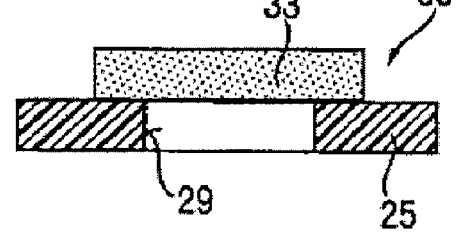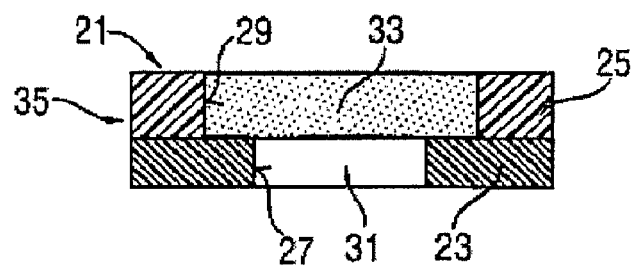

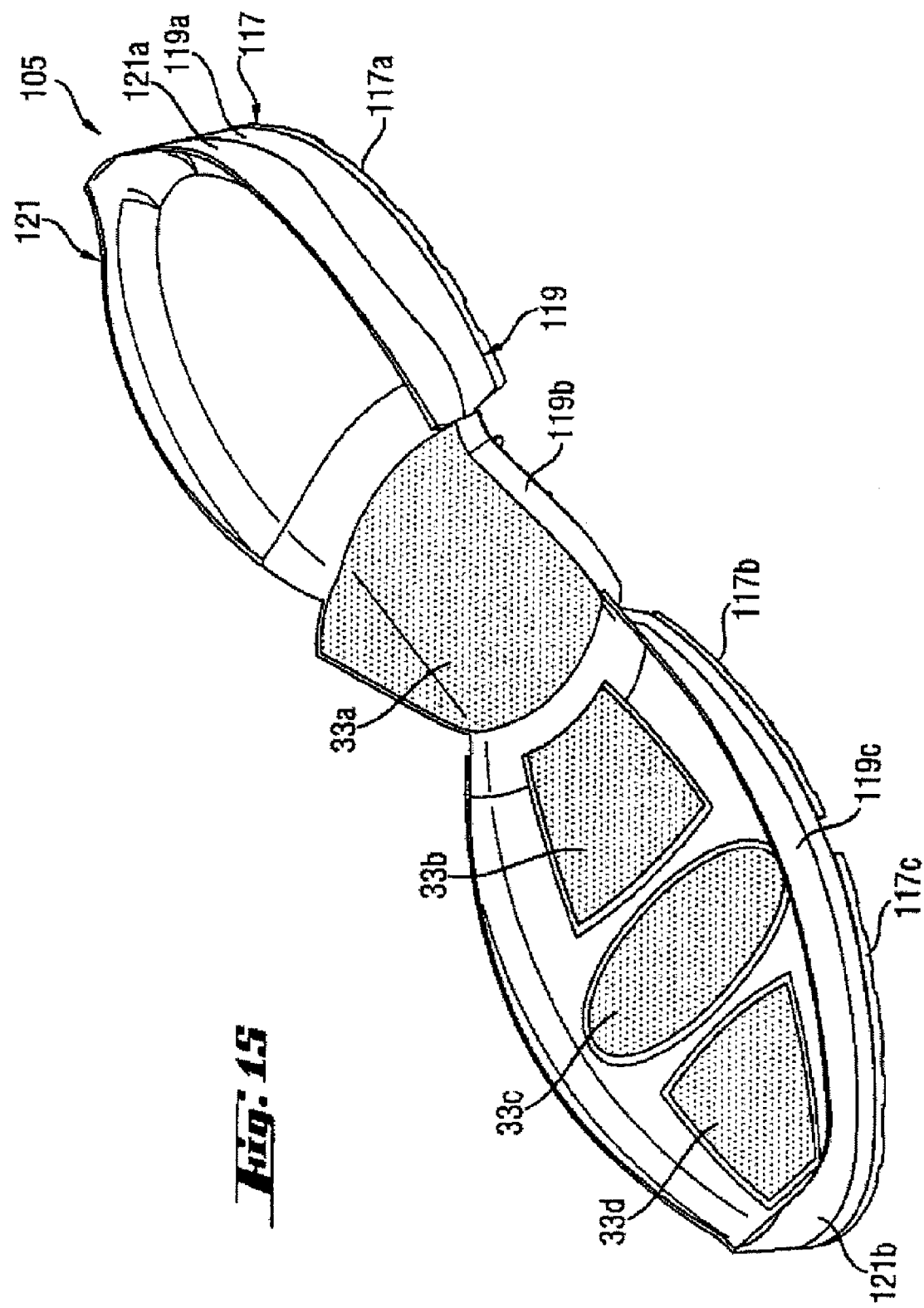

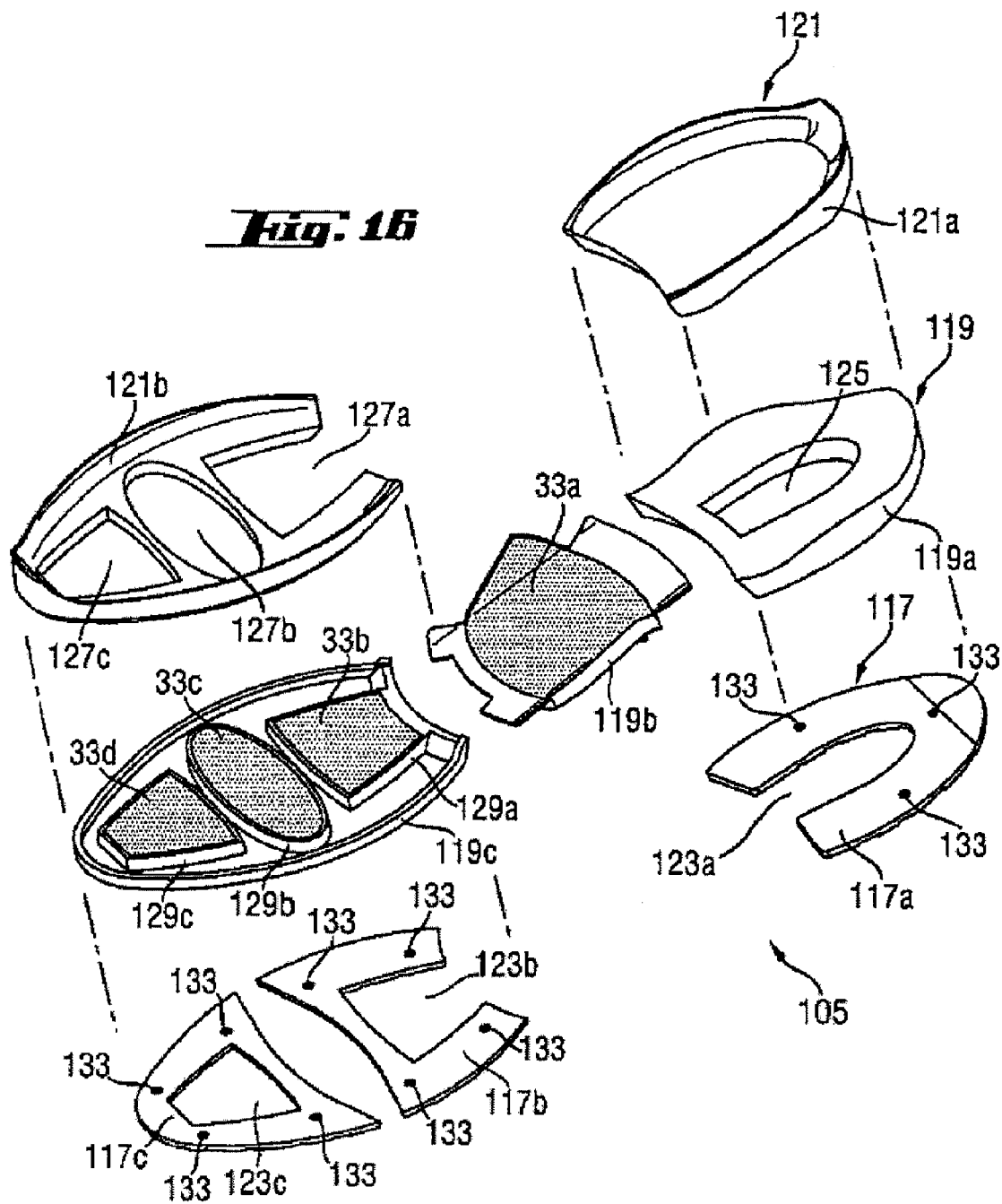

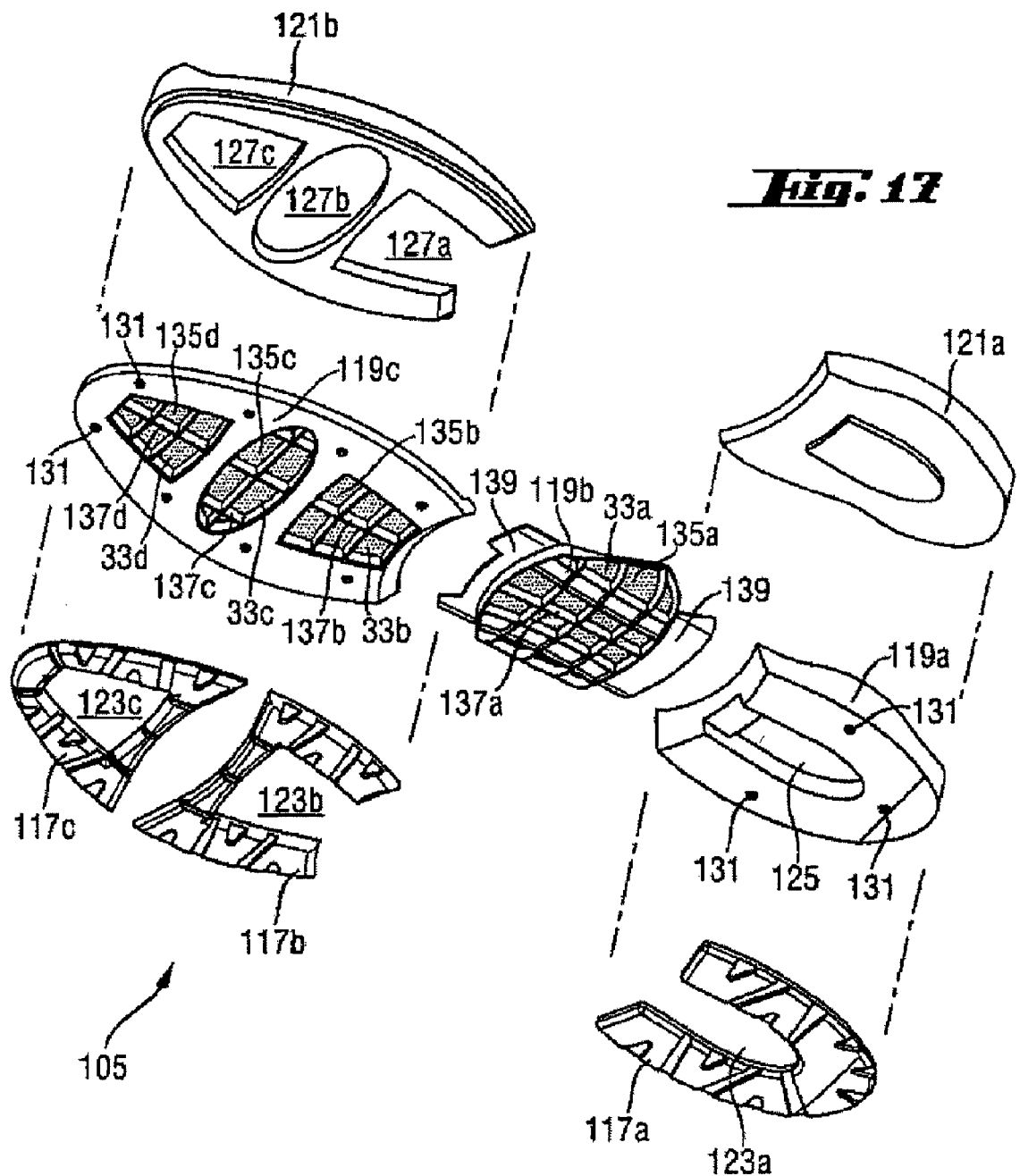

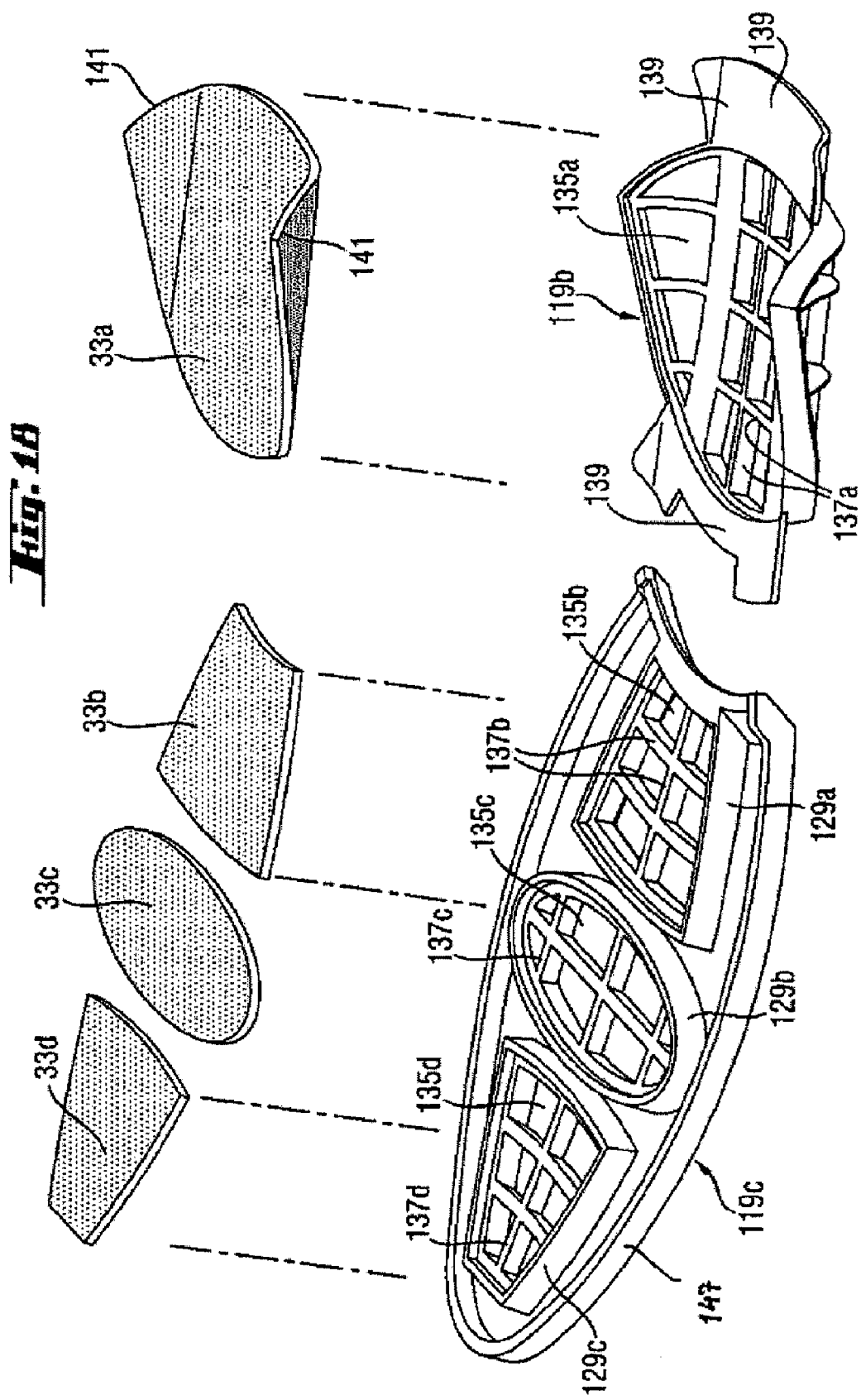

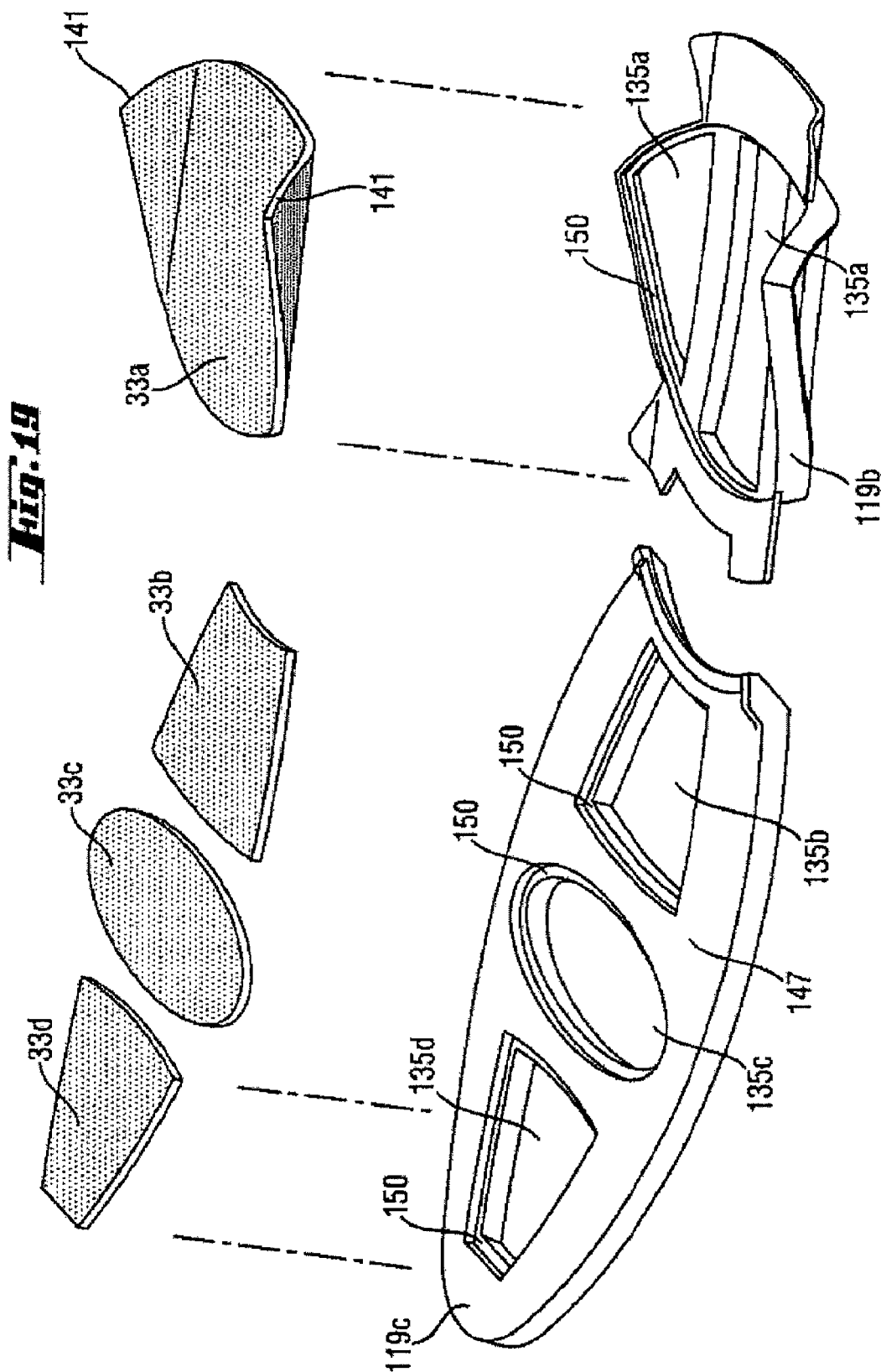

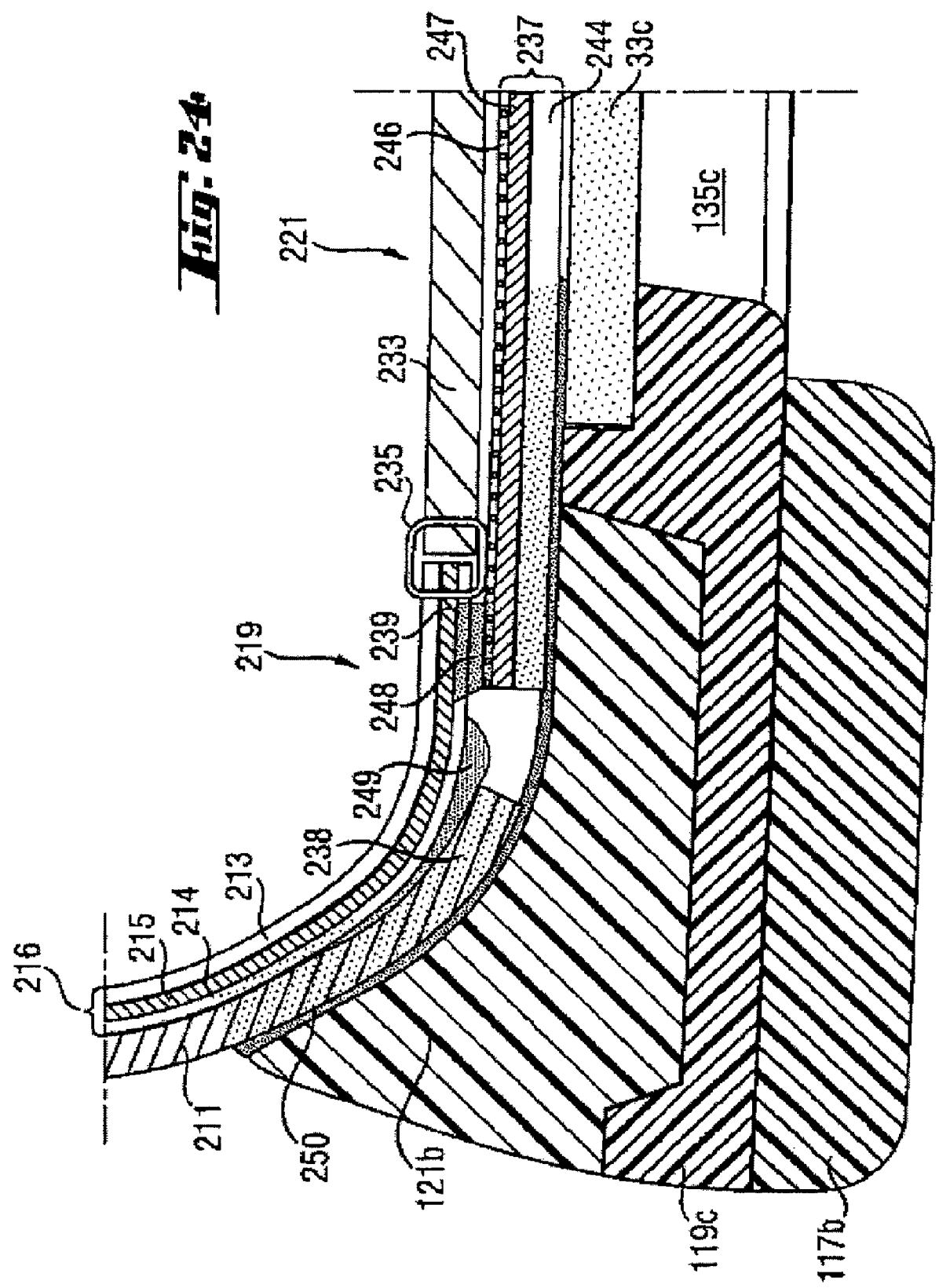

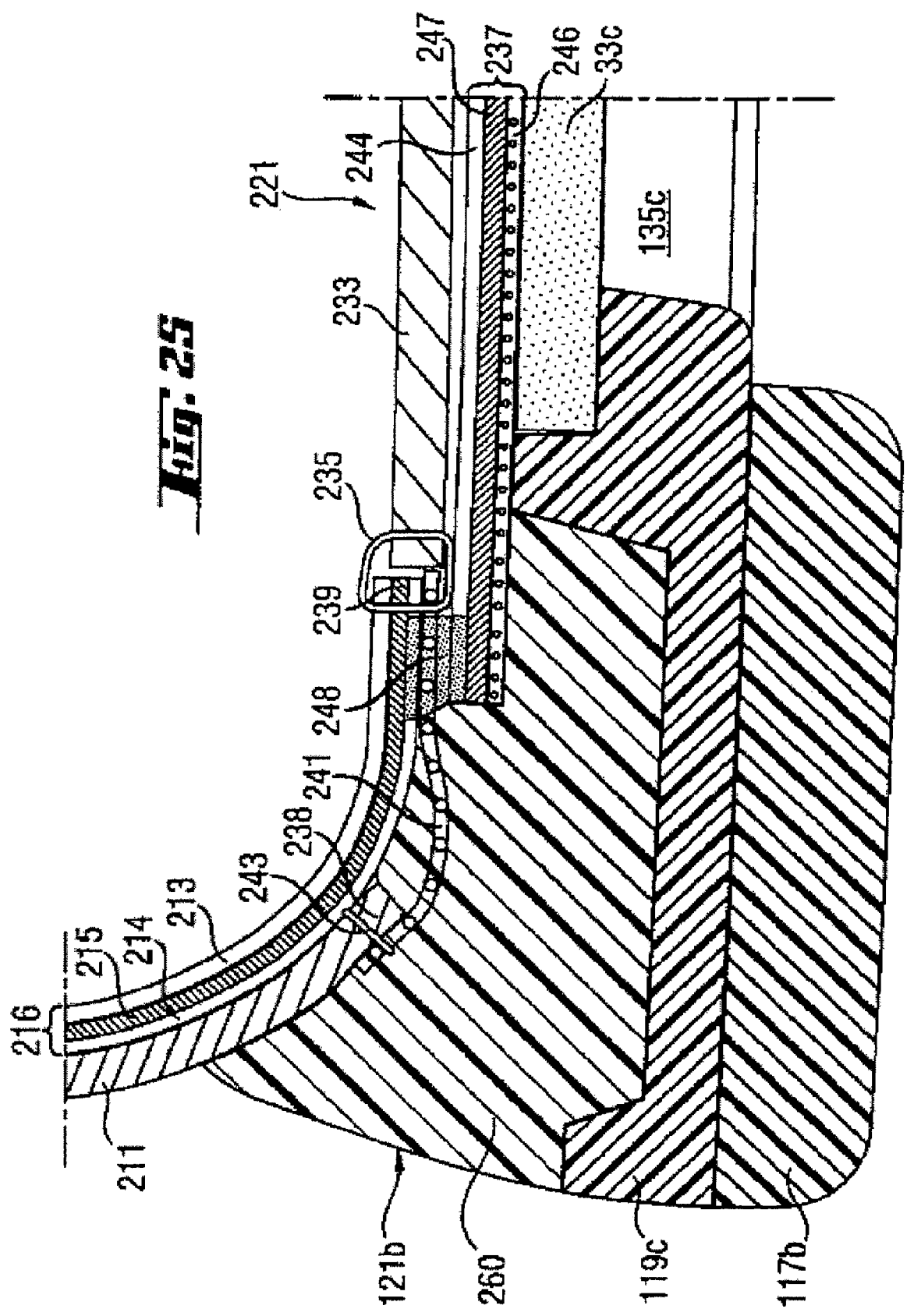

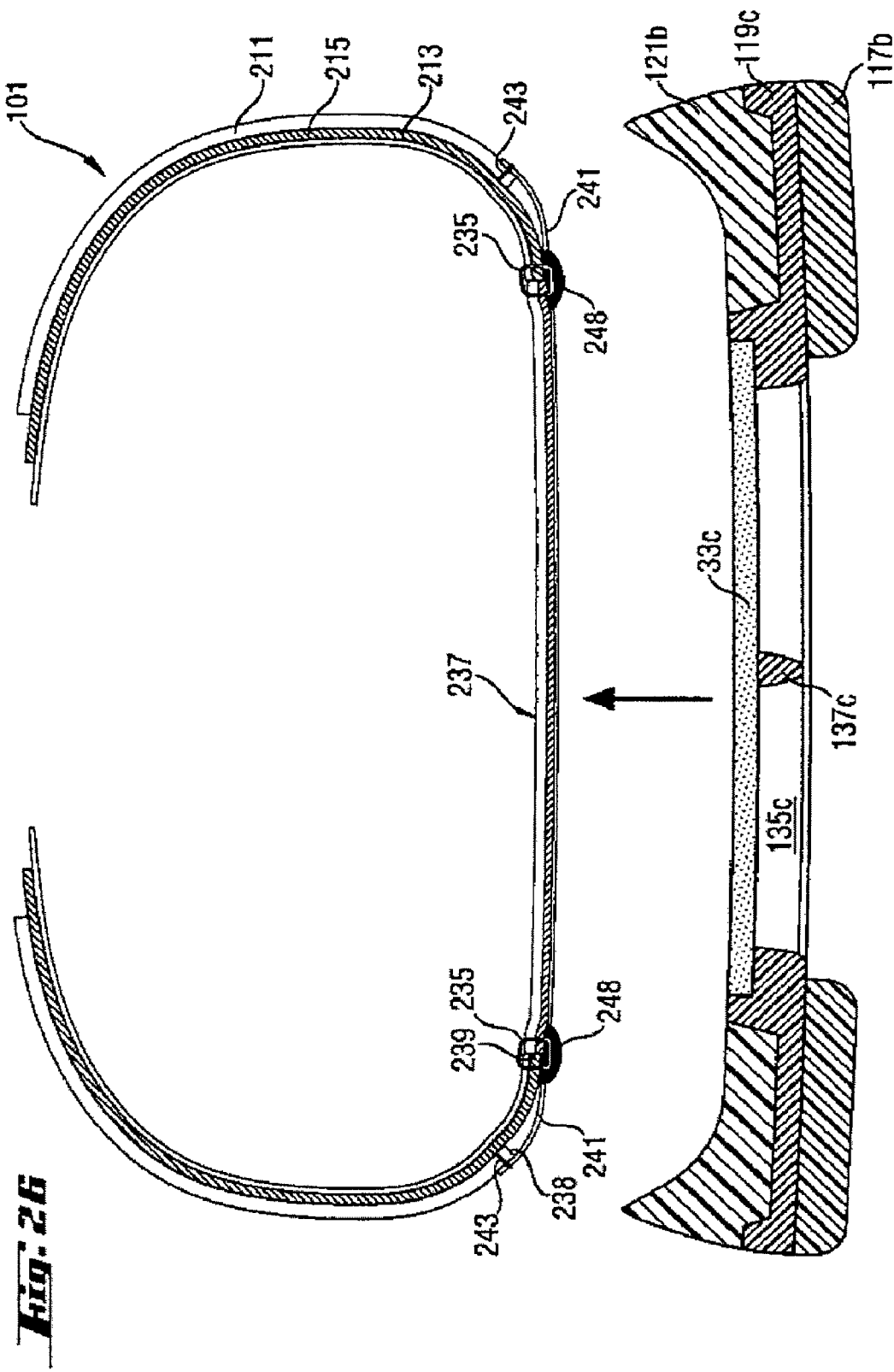

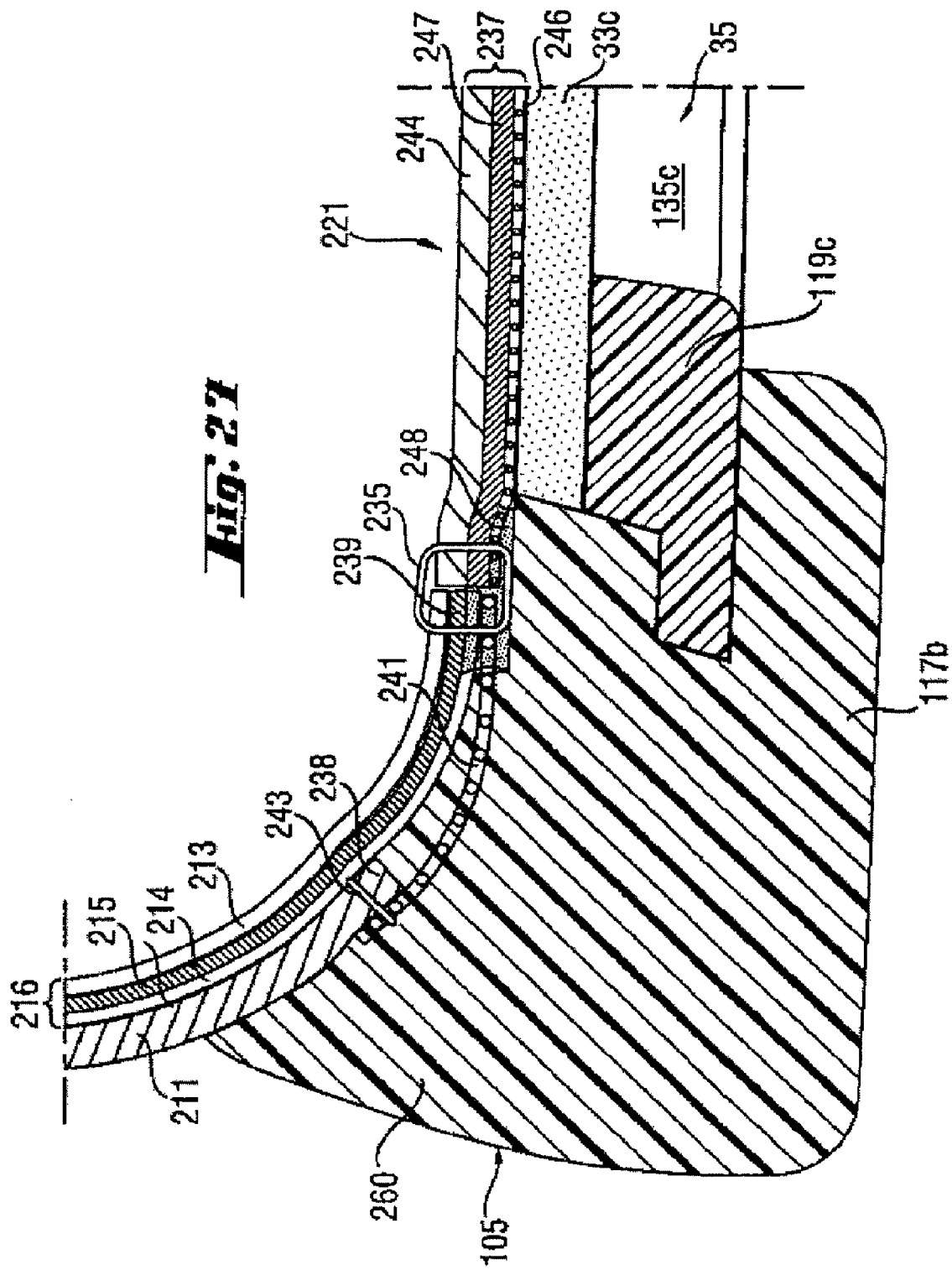

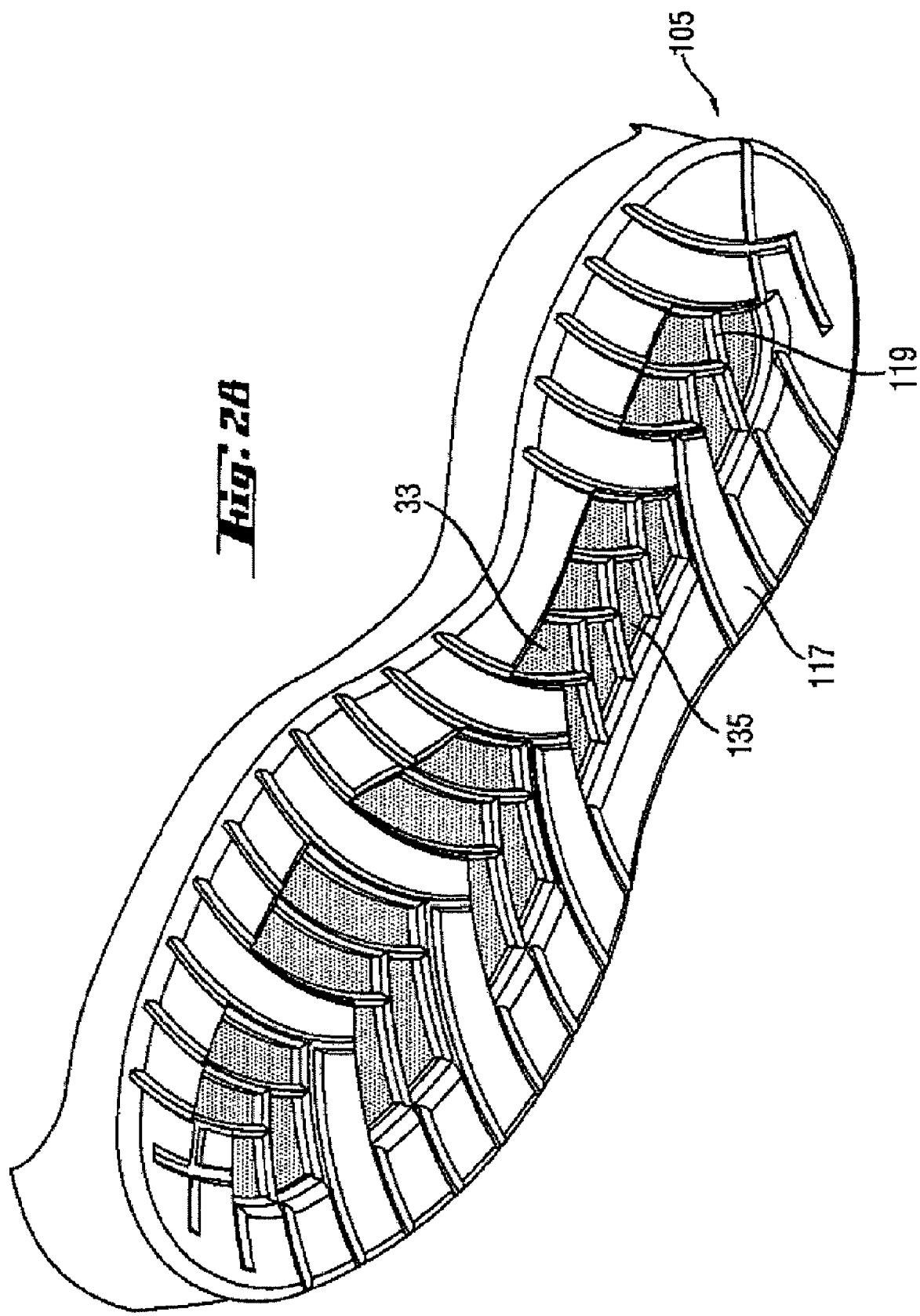

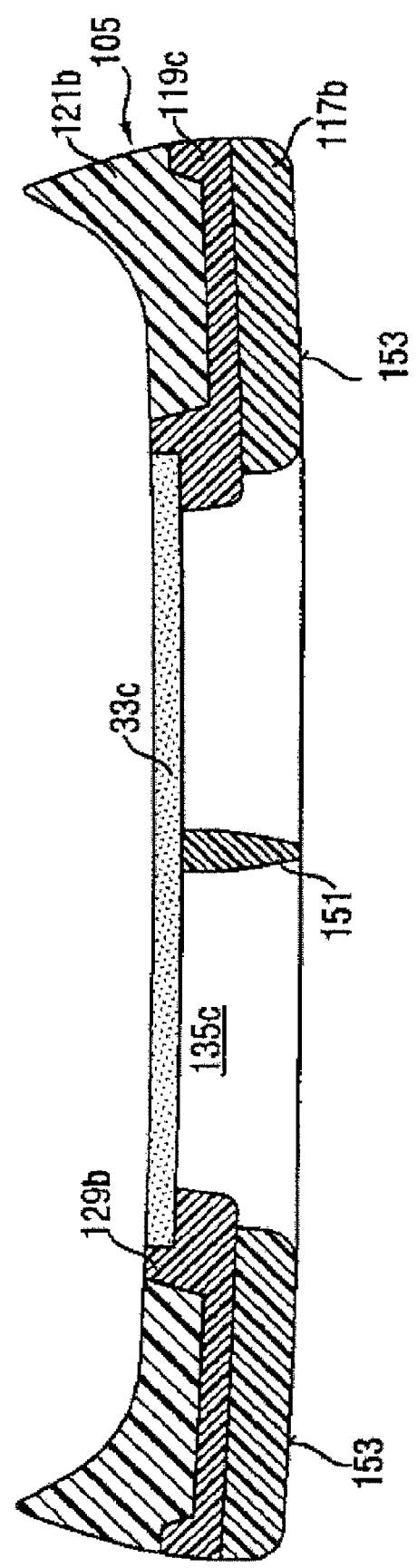

SHOE-REINFORCEMENT MATERIAL AND BARRIER UNIT, COMPOSITE SHOE SOLE, AND FOOTWEAR CONSTITUTED THEREOF

The invention relates to shoe-reinforcement material for use in footwear, a barrier unit constructed with such shoe-reinforcement material, a composite shoe sole constructed with such shoe-reinforcement material or the barrier unit, footwear constructed with such composite shoe sole and a method for producing such footwear.

The need to decide, as an alternative, either on a waterproof shoe bottom structure that blocks sweat moisture or on one permeable to sweat moisture, but also water-permeable, no longer exists, since there have been shoe-bottom structures that are waterproof, despite water vapor-permeability, specifically based on the use of a perforated outsole or one provided with through holes and a waterproof, water vapor-permeable functional layer arranged above it, for example, in the form of a membrane. Documents EP 0,275,644 A2, EP 0,382,904 A2, EP 1,506,723 A2, EP 0,858,270 B1, DE 100 36 100 C1, EP 959,704 B1, WO 2004/028,284 A1, DE 20 2004 08539 U1, and WO 2005/065479 A1 provide examples.

Since the human foot has a strong tendency to sweat, the effort of the present invention seeks to make footwear available that has a shoe-bottom structure with particularly high water-vapor permeability, without seriously compromising its stability.

In footwear with an outsole with small through holes according to EP 0,382,904 A2, sufficient stability of the sole structure can be achieved with normally stiff outsole material, but only with moderate water-vapor permeability of the shoe bottom.

Sole structures according to EP 959,704 B1 and WO 2004/028,284 A1, which have an outsole favoring higher water-vapor permeability, which consist essentially of only a peripheral frame for incorporation of water-vapor-permeable material, in addition to a number of separate outsole cleats, which are supposed to protect a membrane situated above them from penetration of foreign bodies, such as small pebbles, but themselves are not separately stable, do not provide a degree of reinforcement of the sole structure, as is desired for many types of footwear.

The situation is similar in the sole structures according to DE 20 2004 08539 U1 and WO 2005/065,479 A1, in which waterproof, water-vapor-permeable inserts are inserted into large-area openings of the outsole, which have a membrane that covers the opening waterproof, and beneath it a laminated mesh serving to protect the membrane against penetration of foreign objects. Since both the membrane and the laminated mesh consist of relatively soft materials, so that they can scarcely make a contribution to reinforcement of the sole structure, the stability of the sole structure is weakened at the sites of the large-area openings.

Better reinforcement of the shoe bottom structure was achieved in an athletic shoe according to DE 100 36 100 C1, whose outsole is formed from outsole parts with large-area openings, in that the outsole parts are arranged on the bottom of a support layer consisting of compression-proof plastic, which is provided with mesh-like openings at the sites that lie above the large-area openings of the outsole parts and is therefore water vapor-permeable, like the outsole parts. A membrane is arranged between a support layer and an insole situated above it provided with holes for water-vapor permeability, with which not only waterproofness with water-vapor permeability is to be achieved, but small pebbles that the mesh openings of the support layer cannot keep out are also supposed to be prevented from penetrating into the shoe interior. The membrane, which is easily damaged by mechanical effects, is therefore supposed to offer protection that it itself actually requires.

Other solutions, for example, according to EP 1,506,723 A2 and EP 0,858,270 B1, propose a protective layer beneath the membrane as protection against penetration of foreign objects, such as pebbles that have entered through a perforated outsole, to the membrane.

In embodiments of EP 1,506,723 A2, the membrane and the protective layer are joined to each other by spot gluing, i.e., by means of a glue pattern applied as a dot matrix. Only the surface part of the membrane not covered by glue is still available for water-vapor transport. The membrane and the protective layer then form a glue composite that either forms a composite sole with an outsole that is attached as such to the shaft bottom of the footwear or form a part of the shaft bottom, onto which an outsole still has to be attached.

In another embodiment of EP 1,506,723 A2, the outsole is divided in two in terms of thickness, both outsole layers are provided with flush through holes of relatively small diameter, and the protective layer is arranged between the two outsole layers. The membrane in the finished footwear is situated on the top of the outsole. Since only the through hole surface part of this outsole is available for water-vapor passage, only a correspondingly smaller part of the membrane surface can have an effect on water-vapor passage. It has also turned out that standing air volumes inhibit water-vapor transport. Such standing air volumes are formed in the through holes of this outsole, and their elimination by air circulation through the outsole is adversely affected by the protective layer. Added to the effect that the surface parts of the membrane that lie outside the through holes of the outsole and make up a significant percentage of the total membrane area cannot have an effect with respect to water-vapor transport is the fact that the surface parts of the membrane opposite the through holes also have only a restricted effect with respect to water-vapor transport.

It is now a common division of labor in the production of footwear that one manufacturer produces the shoe shaft and another manufacturer is responsible for producing the corresponding shoe sole or the corresponding composite shoe sole or molding it onto the shoe shaft. Since the manufacturers of shoe soles are ordinarily less equipped and experienced in handling waterproof, water-vapor-permeable membranes, shoe-bottom concepts are worth seeking, in which the composite shoe sole, as such, is free of a membrane and the membrane forms part of the shaft bottom onto which the composite shoe sole is arranged. It is therefore the object of the present invention to provide footwear that has a shoe-bottom structure with permanent waterproofness and with particularly high water-vapor permeability, preferably achieving the highest possible stability of the shoe-bottom structure, a composite shoe sole suitable for this, as well as a method for producing footwear.

According to a first aspect of the invention, a shoe-reinforcement material is made available, that has a fiber composite with a first fiber component and a second fiber component, having two fiber parts, in which the first fiber component has a first melting point and a first softening temperature range lying below it, and the second fiber part of the second fiber component has a second melting point and a second softening temperature range lying below it, the first melting point and the first softening temperature range being higher than the second melting point and the second softening temperature range, the first fiber part of the second fiber component having a higher melting point and a higher softening temperature lying below it when the second fiber part and the fiber composite, as a result of thermal activation of the second fiber part of the second fiber component, is thermally bonded, while maintaining water-vapor permeability in the thermally bonded area with an adhesive softening temperature lying in the second softening temperature range.

"Melting point" is understood to mean, in the field of polymer or fiber structures, a narrow temperature range in which the crystalline areas of the polymer or fiber structure melt and the polymer converts to a liquid state. It lies above the softening temperature range and is a significant characteristic for partially crystalline polymers. "Softening temperature range" is understood to mean, in the field of synthetic fibers, a temperature range of different width occurring before the melting point is reached, in which softening, but no melting occurs.

This property is utilized in the reinforcement material according to the invention in that a material choice made for the two fiber components of the fiber composite so that the conditions according to the invention with respect to melting points and softening temperature ranges are met for the two fiber components and fiber parts, and a temperature is chosen for thermal bonding that represents an adhesive softening temperature for the second fiber part of the second fiber component, at which softening of this fiber part of the second fiber component occurs, in which case its material exerts an adhesive effect, so that at least part of the fibers of the second fiber component are thermally bonded to one another by gluing, to the extent that bonding reinforcement of the fiber composite occurs, which lies above the bonding obtained in a fiber composite with the same materials for the two fiber components by purely mechanical bonding, for example, by needle-bonding of the fiber composite. The adhesive softening temperature can also be chosen in such a way that softening of the second fiber part of the second fiber component occurs to such an extent that gluing develops not only of the [fibers of the] second fiber part of the second fiber component to one another, but also partial or full enclosure of individual sites of the fibers of the first fiber component with softened material of the second fiber part of the second fiber component, i.e., partial or complete embedding of such sites of fibers of the first fiber component in the material of the second fiber part of the second fiber component, so that a correspondingly increased reinforcement bonding of the fiber composite develops. This also applies to the case in which the second fiber component is a fiber structure with two axially running fiber parts arranged side-to-side, one of which has a higher melting point and a higher softening temperature range and the other has a lower melting point and a lower softening temperature range. In this case, during adhesive softening of the second fiber part of the second fiber component to the mentioned extent, partial or full enclosure not only of individual sites of the fibers of the first fiber component, but also the first fiber part of the second fiber component occurs.

By additional compression of the fiber composite during or after adhesive softening of the second fiber component, an additional increase in reinforcement can be achieved, through which partial or full embedding of fiber sites in softened material of fibers of the second fiber component is further intensified. The thermal bonding of the fiber composite, achieved by using the adhesive softening temperature, is to be chosen, on the other hand, in such a way that sufficient water-vapor permeability of the fiber composite is produced, i.e., fiber bonding is always restricted to the individual bonding sites, so that sufficient unbonded sites for water-vapor transport remain. The choice of adhesive softening temperature can be made according to the desired requirements of the practical embodiment, especially with respect to stability properties and water-vapor permeability.

The choice (unlike in the present invention) of two fiber components, one of which has a higher first melting point and a higher first melting-point range and the other a lower second melting point and a lower second softening temperature range, a fiber composite with lower stability is obtained. On the one hand, fibers with a lower melting point and a lower softening temperature range are generally not as mechanically strong and stable as fibers with a higher melting point and a higher softening temperature range. On the other hand, an additional mechanical weakening of the fiber components with a lower melting point can occur during adhesive softening, for example, by a reduction in the fiber cross-section as a result of tensile forces that can occur during the adhesive softening process.

Since, according to the invention, both fiber components are constructed with fiber materials with a higher first melting point and a higher first softening temperature range, the first fiber component overall and a fiber part in the second fiber component and only the other fiber part of the second fiber component have a lower second melting point and the lower second softening temperature range, both fiber components provide a mechanical stability imparted by the fiber material with the higher melting point in the higher softening temperature range, with the result of a mechanically particularly stable fiber composite. The first fiber component and the first fiber part of the second fiber component each form a stabilizing support component, only the second fiber part of the second fiber component forming the bonding component of the barrier material.

By choosing certain materials for the two fiber components and by choosing the degree of thermal bonding of the fiber composite, a desired reinforcement of the fiber composite with respect to its state before thermal bonding can be achieved while maintaining water-vapor permeability. Because of this thermal bonding, the fiber composite reaches a strength, based on which it is particularly suitable as a shoe-reinforcement material, which finds use, especially at the locations in the shoe bottom of footwear, at which water-vapor permeability is important. Examples of use of the shoe-reinforcement material according to the invention in the area of the shoe bottom are insert soles, insoles or shaft-mounting soles, and protective layers.

Because of its thermal bonding and the stability achieved, such a barrier material is particularly suited for a composite shoe sole that is designed to obtain high water-vapor permeability with large-area openings, so that it requires, on the one hand, a barrier material to protect a membrane situated above it from penetration up to the membrane.

Unlike a non-woven fiber composite ordinarily used in the shoe bottom area, which is constructed with a single fiber component that is completely melted and thermally compressed in the attempt at thermal bonding, in such a shoe-reinforcement material according to the invention, by selecting the materials for the at least two fiber components and by the parameters chosen for thermal bonding, degrees of freedom can be utilized by means of which the degree of the desired stability, as well as the degree of water-vapor permeability can be set. By softening the fiber component with the lower melting point, not only are the fibers of this fiber component fixed with respect to each other, but during the thermal bonding process, fixation of the fiber of the other fiber component with the higher melting point also occurs, which leads to particularly good mechanical bonding and stability of the fiber composite. By choosing the ratio between fibers of the fiber component with a higher melting point and the fibers of the fiber component with a lower melting point, as well as by choosing the adhesive softening temperature and therefore the degree of softening, properties of the shoe-reinforcement material, such as air permeability, water-vapor permeability, and mechanical stability of the shoe-reinforcement material, can be adjusted.

In one embodiment of the shoe-reinforcement material according to the invention, its fiber composite is a textile fabric, which can be a woven, warp-knit, knit, or non-woven fabric, or a felt, mesh, or lay. In a practical embodiment, the fiber composite is a mechanically strengthened non-woven material, in which mechanical bonding can be achieved by needling of the fiber composite. Water-jet bonding can also be used for mechanical bonding of the fiber composite, where, instead of true needles, water jets are used for mechanical bonding entanglement of the fibers of the fiber composite.

The first fiber component and the first fiber part of the second fiber component in the shoe-reinforcement material according to the invention each form a support component, and the second fiber part of the second fiber component forms a bonding component of the shoe-reinforcement material.

The choice of materials for the fiber components is made in one embodiment, in such a way that at least part of the second fiber component and then, if the second fiber component includes at least a first fiber part and a second fiber part, at least part of the second fiber part of the second fiber component can be activated at a temperature in the range between 80 and 230° C. for adhesive softening.

In one embodiment, the second softening temperature range lies between 60 and 220° C.

Especially in view of the fact that footwear and mostly its sole structure are often exposed to relatively high temperatures during production, for example, during molding-on of an outsole, in one embodiment of the invention, the first fiber component, and optionally the first fiber part of the second fiber component, are melt-resistant at a temperature of at least 130° C., whereby, in practical embodiments, melt resistance at a temperature of at least 170° C. or even at least 250° C. is chosen by appropriate selection of the material for the first fiber part, and optionally for the first fiber part of the second fiber component.

For the first fiber part, and optionally the first fiber part and the second fiber component, materials such as natural fibers, plastic fibers, metal fibers, glass fibers, carbon fibers, and blends thereof, are appropriate. Leather fibers represent an appropriate material in the context of natural fibers.

In one embodiment of the invention, the second fiber part of the second fiber is constructed with at least one synthetic fiber suitable for thermal bonding at an appropriate temperature.

In one embodiment of the invention, at least one of the two fiber components, and optionally at least one of the two fiber parts of the second fiber component, are chosen from the material group comprising polyolefins, polyamide, copolyamide, viscose, polyurethane, polyacrylic, polybutylene terephthalate, and blends thereof. The polyolefin can then be chosen from polyethylene and polypropylene.

In one embodiment of the invention, at least the second fraction of the second fiber component is constructed with at least one thermoplastic material. The second fiber part of the second fiber component can be chosen from the material group polyamide, copolyamide, polybutylene terephthalate, and polyolefins, or also from the material group polyester and copolyester.

Examples of appropriate thermoplastic materials are polyethylene, polyamide (PA), polyester (PET), polyethylene (PE), polypropylene (PP), and polyvinylchloride (PVC). Additional appropriate materials are rubber, thermoplastic rubber (TR), and polyurethane (PU). Thermoplastic polyurethane (TPU), whose parameters (hardness, color, elasticity, etc.) can be adjusted very variably, is also suitable.

In one embodiment of the invention, both fiber parts of the second fiber component consist of polyester, the polyester of the second fiber part having a lower melting point than the polyester of the first fiber part.

Polyester polymers have a melting point in the range from 256° C. to 292° C. (see Textilpraxis International, Denkendorf Fiber Table 1986, ITV (Institute for Textile and Process Technology)). In a practical embodiment, a polyester with a softening temperature of about 230° C. is chosen for the first fiber component and a polyester with an adhesive softening temperature of about 200° C. is chosen for the second fiber part of the second fiber component.

In one embodiment of the invention, at least the second fiber component has a core-shell structure, i.e., a structure, in which a core material of the fiber component is coaxially surrounded by a shell layer. The first fiber part, having a higher melting point, then forms the core and the second fiber part, having a lower melting point, forms the shell.

In another embodiment of the invention, the second fiber component has a side-to-side structure, i.e., there are two different fiber parts running in the longitudinal direction of the fiber, each of which has a semicircular cross-section, positioned against each other so that the two fiber components are joined lying side by side. One side forms the fiber part having a higher melting point and the second side the second fiber part having a lower melting point.

One side then forms the first fiber part, having a higher melting point, and the second side the second fiber part, having a lower melting point, of the second fiber component of the shoe-reinforcement material.

In one embodiment of the invention, the second fiber component has a weight percentage, with respect to the basis weight of the fiber composite, in the range from 10% to 90%. In one embodiment, the weight percentage of the second fiber component lies in a range from 10% to 60%. In practical embodiments, the weight percentage of the second fiber component lies at 50% or 20%.

In one embodiment of the invention, the materials of the two fiber components, and optionally for the two fiber parts of the second fiber component, are chosen in such a way that their melting points differ by at least 20 C°.

The shoe-reinforcement material can be thermally bonded over its entire thickness. Depending on the requirements to be achieved, especially with respect to air permeability, water-vapor permeability, and stability, embodiments can be chosen in which only part of the thickness of the shoe-reinforcement material is thermally bonded. In one embodiment of the invention, the thermally bonded shoe-reinforcement material, over at least part of its thickness, is additionally compressed on at least one surface by means of pressure and temperature for surface smoothing. When the shoe-reinforcement material is used as an inner sole, this leads to the advantage that the foot of the user of the footwear is in contact with the smooth inner sole surface. When the shoe-reinforcement material is used as a barrier material to protect a membrane lying above it, it can be advantageous to smooth the bottom of the shoe-reinforcement material facing the tread of the composite shoe sole by surface compression, because dirt that reaches the bottom of the shoe-reinforcement material through holes of the composite shoe sole then adheres less readily to it. At the same time, the abrasion resistance of the shoe-reinforcement material is increased.

In another embodiment, the shoe-reinforcement material according to the invention is finished with one or more agents from the material group water-repellants, dirt-repellants, oil-repellants, antibacterial agents, deodorants, and combinations thereof.

In another embodiment, the barrier material is made water-repellant, dirt-repellant, oil-repellant, or antibacterial, and/or treated against odor.

In one embodiment of the invention, the shoe-reinforcement material has a water-vapor permeability of at least 4000 g/m²-24 h. In practical embodiments, a water-vapor permeability of at least 7000 g/m²-24 h or even 10,000 g/m²-24 h is chosen.

In embodiments of the invention, the shoe-reinforcement material has a thickness in the range from at least 1 mm to 5 mm, whereby practical embodiments, especially in the range from 1 mm to 2.5 mm, or even in the range from 1 mm to 1.5 mm, are chosen, the specially selected thickness depending on the special application of the shoe-reinforcement material, and also on which surface we desire to provide with smoothness, air permeability, water-vapor permeability, and mechanical strength.

In a practical embodiment of the invention, the shoe-reinforcement material has a fiber composite with at least two fiber components that differ with respect to melting point and softening temperature range, a first fiber component consisting of polyester and having a first melting point and a first softening temperature range lying below it, and at least part of a second fiber component having a second melting point and a second softening temperature range lying below it, whereby the first melting point and the first melting-point range are higher than the second melting point and the second melting-point range. The second fiber component has a core-shell structure and a first fiber part of polyester that forms the core and a second fiber part of polyester that forms the shell, the first fiber part having a higher melting point and a higher softening temperature range than the second fiber part. The fiber composite, as a result of thermal activation of the second fiber component, is thermally bonded, while maintaining water-vapor permeability in the thermally bonded area, with an adhesive softening temperature lying in the second softening temperature range, and the fiber composite is a needled felt that is compressed at least on one of its surfaces by means of pressure and temperature.

In one embodiment of the invention, the shoe-reinforcement material is obtained by surface compression of a surface of the fiber composite with a surface pressure in the range from 1.5 N/cm² to 4 N/cm² at a heating-plate temperature of 230° C. for 10 s. In a practical embodiment, the surface compression of a surface of the fiber composite occurs with a surface pressure of 3.3 N/cm² at a heating-plate temperature of 230° C. for 10 s.

In one embodiment of the invention, the shoe-reinforcement material is produced with a puncture strength in the range from 290 N to 320 N, so that it forms good protection for a waterproof, water-vapor-permeable membrane situated above it against penetration of foreign objects such as small pebbles.

A shoe-reinforcement material according to the invention can be used in a water-vapor-permeable composite shoe sole, for example, as a water-vapor-permeable barrier layer that stabilizes the composite shoe sole and protects a membrane situated above it.

According to a second aspect, the invention makes available a water-vapor-permeable barrier unit that is constructed with at least one piece of a shoe-reinforcement material, having a fiber composite with at least two fiber components that differ with respect to melting point, whereby at least one part of a first fiber component has a first melting point and a first melting-point range lying below it, and at least one part of the second fiber component has a second melting point and a second softening temperature range lying beneath it, and the first melting point and the first softening temperature range are higher than the second melting point and the second softening temperature range, whereby the fiber composite, as a result of thermal activation of the second fiber component, is thermally bonded, while maintaining water-vapor permeability in the thermally bonded area, with an adhesive softening temperature lying in the second softening temperature range and whereby the barrier unit is formed as at least part of a water-vapor-permeable composite shoe sole with at least one through hole extending through the thickness of the composite shoe sole, and the barrier unit is formed in such a way that its reinforcement material, after preparation of the composite shoe sole, closes off its at least one through hole as a barrier against penetration of foreign objects through the at least one through hole and therefore through the composite shoe sole.

In one embodiment of the invention, at least one reinforcement device is assigned to the at least one piece of shoe-reinforcement material. This achieves a situation in which additional reinforcement is added to the intrinsic stability that the shoe-reinforcement material has, because of its thermal bonding, and optionally surface compression, which can be deliberately produced at certain sites in the barrier unit, especially in the area of through holes of the composite shoe sole that are made over a large area, in order to provide high water-vapor permeability of the composite shoe sole.

The forefoot area and midfoot area of the composite shoe sole will be discussed next. In the human foot, the forefoot is the longitudinal foot area extending over the toes and ball of the foot to the beginning of the instep, and the midfoot is the longitudinal foot area between the ball of the foot and the heel. In connection with the composite shoe sole according to the invention, "forefoot area" and "midfoot area" mean the longitudinal area of the composite shoe sole over which the forefoot or the midfoot of the wearer of the footwear extends when footwear provided with such a composite shoe sole is worn.

In one embodiment of the invention, the at least one stabilization device is designed in such a way that at least 15% of the surface of the forefoot area of the composite shoe sole is water-vapor-permeable.

In one embodiment of the invention, the at least one stabilization device is designed in such a way that 25% of the surface of the forefoot area of the composite shoe sole is water-vapor-permeable.

In one embodiment of the invention, the at least one stabilization device is designed in such a way that 40% of the surface of the forefoot area of the composite shoe sole is water-vapor-permeable.

In one embodiment of the invention, the at least one stabilization device is designed in such a way that 50% of the surface of the forefoot area of the composite shoe sole is water-vapor-permeable.

In one embodiment of the invention, the at least one stabilization device is designed in such a way that 60% of the surface of the forefoot area of the composite shoe sole is water-vapor-permeable.

In one embodiment of the invention, the at least one stabilization device is designed in such a way that 75% of the surface of the forefoot area of the composite shoe sole is water-vapor-permeable.

In one embodiment of the invention, the at least one stabilization device is designed in such a way that 30% of the surface of the midfoot area of the composite shoe sole is water-vapor-permeable.

In one embodiment of the invention, the at least one stabilization device is designed in such a way that 50% of the surface of the midfoot area of the composite shoe sole is water-vapor-permeable.

In one embodiment of the invention, the at least one stabilization device is designed in such a way that 60% of the surface of the midfoot area of the composite shoe sole is water-vapor-permeable.

In one embodiment of the invention, the at least one stabilization device is designed in such a way that 75% of the surface of the midfoot area of the composite shoe sole is water-vapor-permeable.

In one embodiment of the invention, the at least one stabilization device is designed in such a way that 15% of the surface of the midfoot area of the composite shoe sole is water-vapor-permeable.

In one embodiment of the invention, the at least one stabilization device is designed in such a way that 25% of the surface of the midfoot area of the composite shoe sole is water-vapor-permeable.

In one embodiment of the invention, the at least one stabilization device is designed in such a way that at least 40% of the front half of the longitudinal extent of the composite shoe sole is water-vapor-permeable.

In one embodiment of the invention, the at least one stabilization device is designed in such a way that at least 60% of the front half of the longitudinal extent of the composite shoe sole is water-vapor-permeable.

In one embodiment of the invention, the at least one stabilization device is designed in such as way that at least 75% of the front half of the longitudinal extent of the composite shoe sole is water-vapor-permeable.

In one embodiment of the invention, the at least one stabilization device is designed in such a way that of the longitudinal extent of the composite shoe sole minus the heel area, at least 15% is water-vapor-permeable.

In one embodiment of the invention, the at least one stabilization device is designed in such a way that of the longitudinal extent of the composite shoe sole minus the heel area, at least 25% is water-vapor-permeable.

In one embodiment of the invention, the at least one stabilization device is designed in such a way that of the longitudinal extent of the composite shoe sole minus the heel area, at least 40% is water-vapor-permeable.

In one embodiment of the invention, the at least one stabilization device is designed in such a way that of the longitudinal extent of the composite shoe sole minus the heel area, at least 60% is water-vapor-permeable.

In one embodiment of the invention, the at least one stabilization device is designed in such a way that of the longitudinal extent of the composite shoe sole minus the heel area, at least 75% is water-vapor-permeable.

The percentages just stated in connection with water-vapor permeability, refer to that part of the entire composite shoe sole that corresponds to the area within the outside contour of the foot sole of the wearer of the footwear, i.e., essentially the surface part of the composite shoe sole that is enclosed in the finished footwear by the inner periphery of the lower shaft end on the sole side (shaft contour on the sole side). A shoe-sole edge that protrudes radially outward above the shaft contour on the sole side, i.e., protrudes above the foot sole of the wearer of the footwear, need not have water-vapor permeability, because no sweat-releasing foot area is situated there. The percentages mentioned therefore refer, with respect to the forefoot area, to the part of the area included by the shaft contour on the sole side, bounded on the forefoot length and, with respect to the midfoot area, to the part of the surface enclosed by the shaft contour on the sole side, bounded on the midfoot length.

If the footwear considered is a business shoe whose outsole has an outsole peripheral edge protruding relatively widely above the outside of the shaft contour on the sole side, which, for example, is firmly stitched onto a mounting frame that also runs around the outside of the shaft contour on the sole side, water-vapor permeability need not exist in the area of this outsole peripheral edge, since this area is situated outside the part of the composite shoe sole contacted by the foot, and therefore no sweat release occurs in this area. The percentages mentioned in the preceding paragraphs refer to footwear that does not have the above-mentioned protruding outsole edge typical of business shoes. Since this outsole area of the business shoe can account for about 20% of the total outsole surface, about 20% can be subtracted from the total outsole area in business shoes, and the above-mentioned percentages for water-vapor permeability of the composite shoe sole pertain to the remaining 80% of the total outsole area.

The reinforcement device can consist of one or more reinforcement bars that are arranged, for example, on the bottom of the barrier material on the outsole side.

In one embodiment, the reinforcement device is provided with at least one opening that forms at least one part of the through hole after production of the composite shoe sole and is closed with barrier material.

In one embodiment of the invention, the above-mentioned percentage water-vapor permeabilities in the forefoot area and/or midfoot areas are provided mostly or even exclusively in the area of the at least one opening of the reinforcement device.

In one embodiment of the invention, at least one support element is assigned to the shoe-reinforcement material in the through hole or at least one of the through holes that extends from the side of the shoe-reinforcement material facing the tread to the level of the tread, so that the shoe-reinforcement material, during walking, is supported on the floor by the support element. In this case, at least one of the reinforcement bars can simultaneously be designed as a support element.

For example, if we have a composite shoe sole that has the barrier unit and a one-part or two-part outsole arranged beneath it that has passage openings for water-vapor permeability, the passage openings of the outsole or outsole parts and the barrier unit can have the same or different areas. It is important that these passage openings at least partially overlap, in which case an intersection surface of the corresponding passage opening of the barrier unit and the corresponding passage opening of the outsole or the outsole part forms a through hole through the entire composite shoe sole. In stipulating a specific dimension of the passage opening of the outsole or outsole part, the extent of the through hole is greatest, if the corresponding passage opening of the barrier unit is at least equally large and extends over the entire area of the corresponding passage opening of the outsole or outsole part, or vice versa.

Due to the fact that the corresponding opening of the composite shoe sole is closed with a water-vapor-permeable barrier material, water-vapor permeability in the at least one opening of the composite shoe sole is achieved with simultaneous protection of a membrane situated above it against the penetration of foreign objects, such as pebbles. Since the shoe-reinforcement material used for the barrier unit is a result of thermal bonding and optionally additional surface compression and can be equipped with significantly higher intrinsic stability, than the material can provide without thermal bonding and surface bonding, the shoe-reinforcement material of the barrier unit can offer sufficient reinforcement to the composite shoe sole provided with the through holes, even if the one or more openings of the composite shoe sole are designed with a very large area in the interest of high water-vapor-permeability. This intrinsic stability is further increased by the use of the already mentioned additional reinforcement device selectively in areas of the composite shoe sole that require special reinforcement.

If the reinforcement device is provided with several openings, these can either be closed overall with a piece of the barrier material or each with a piece of barrier material.

The reinforcement device can be designed to be sole-shaped, if it is to extend over the entire area of the composite shoe sole, or partially sole-shaped, if it is to be provided only in part of the area of the composite shoe sole.

In one embodiment of the invention, the reinforcement device of the barrier unit has at least one reinforcement frame that stabilizes at least the composite shoe sole, so that the composite shoe sole experiences an additional reinforcement apart from the stabilizing effect through the barrier material. A particularly good reinforcement effect is achieved, if the reinforcement frame is fit into the at least one opening, or at least one of the openings of the composite shoe sole, so that where the composite shoe sole is initially weakened in its stability by the openings with the largest possible area, good reinforcement of the composite shoe sole is nevertheless ensured by means of the reinforcement frame.

In one embodiment of the barrier unit according to the invention, the at least one opening of the reinforcement device has an area of at least 1 $cm^2$. In practical embodiments, an opening area with at least one opening of at least 5 $cm^2$, for example, in the range from 8 to 15 $cm^2$, or even at least 10 $cm^2$, or even at least 20 $cm^2$, or even at least 40 $cm^2$, is chosen.

In the barrier unit according to the invention, the reinforcement device has at least one reinforcement bar, which is arranged on at least one surface of the barrier material and at least partially bridges the area of the at least one opening. If the reinforcement device is provided with a reinforcement frame, a reinforcement bar can be arranged on the reinforcement frame. Several reinforcement bars can be provided that form a mesh-like structure on at least one surface of the barrier material. Such a mesh structure leads to particularly good reinforcement of the composite shoe sole, on the one hand, and also prevents larger foreign objects, such as larger stones or ground elevations, from penetrating up to the barrier material and being felt by the user of the footwear equipped with such a barrier unit.

In one embodiment, the reinforcement device of the barrier unit according to the invention is constructed with at least one thermoplastic material. Thermoplastic materials of the type already mentioned can be used for this.

In one embodiment of the invention, the reinforcement device and the barrier material are at least partially connected to each other, for example, by gluing, welding, molding on or around, or vulcanization on or around. During molding or vulcanization on, attachment between the reinforcement device and the barrier material occurs mostly on opposite surface areas. During molding and vulcanization around, peripheral incorporation of the barrier material with the reinforcement device mostly occurs.

In one embodiment of the invention, the reinforcement device of the composite shoe sole is designed as an outsole.

In one embodiment of the invention, the barrier unit forms the composite shoe sole. The reinforcement device and the barrier unit can be designed as an outsole. However, there is also the possibility that the barrier unit and an outsole form the composite shoe sole.

In one embodiment, the barrier unit is water-permeable.

According to a third aspect of the invention, a water-vapor-permeable composite shoe sole designed for footwear is made available that has at least one through hole extending through the thickness of the composite shoe sole, which is closed by means of shoe-reinforcement material, that has a fiber composite with at least two fiber components that differ with respect to melting point, whereby at least one part of a first fiber component has a first melting point and a first softening temperature range lying below it, and at least one part of a second fiber component has a second melting point and a second softening temperature range lying below it, and the first melting point and the first softening temperature range are higher than the second melting point and the second softening temperature range, and whereby the fiber composite, as a result of thermal activation of the second fiber component, is thermally bonded, while maintaining water-vapor permeability in the thermally bonded area, with an adhesive softening temperature lying in the second softening temperature range.

In one embodiment, the composite shoe sole according to the invention is constructed with the barrier unit according to the invention, for example, according to one or more of the embodiments mentioned above for the barrier unit.

The composite shoe sole is also made water-permeable. In one modification of the invention, a top of the barrier unit at least partially forms a top of the composite shoe sole.

According to a fourth aspect, the invention makes available footwear with a composite shoe sole according to the invention that can be constructed according to one or more of the embodiments mentioned above in connection with the composite shoe sole. The footwear then has a shaft that is provided on a shaft end area on the sole side with a waterproof and water-vapor permeable shaft-bottom functional layer, whereby the composite shoe sole is connected to the shaft-end area provided with the shaft-bottom functional layer, so that the shaft-bottom functional layer, at least in the area of at least one opening of the composite shoe sole, is not joined to the shoe-reinforcement material.

The shaft-bottom functional layer in this footwear according to the invention, on the shaft end area on the sole side and the barrier material in the composite shoe sole according to the invention, leads to several advantages. On the one hand, handling of the shaft-bottom functional layer is brought into the area of shaft production and kept out of the area of production of the composite shoe sole. This takes into account the practice that shaft manufacturers and composite-sole manufactures are often different manufacturers or at least different manufacturing areas, and the shaft manufacturer is usually better set up to handle functional-layer material and its intrinsic problems than shoe-sole manufacturers or composite-shoe-sole manufacturers. On the other hand, the shaft-bottom functional layer and the barrier material, if they are not accommodated in the composite itself, but are divided to the shaft-bottom composite and the shoe-sole composite, after attachment of the composite shoe sole on the lower shaft-end area, can be kept essentially unconnected to each other, since their positioning with respect to each other in the finished footwear is brought about by attachment (by gluing on or molding on) of the composite shoe sole on the lower shaft end. Keeping the shaft-bottom functional layer and the attaching material fully or largely unbonded to each other means that there need be no gluing between them, which would lead to blocking of part of the active area of the functional layer, affecting water-vapor permeability even in the case of gluing with a spot-like glue.

In one embodiment of the footwear according to the invention, the shaft is constructed with at least one shaft material that has a waterproof shaft functional layer, at least in the area of the shaft-end area on the sole side, whereby a waterproof seal exists between the shaft functional layer and the shaft-bottom functional layer. We then arrive at footwear, in which the foot is waterproof, both in the shaft area and in the shaft-bottom area and at the transition sites between the two, while maintaining water-vapor permeability both in the shaft and the shaft-bottom area.

In one embodiment of the footwear according to the invention, the shaft-bottom functional layer is assigned to a water-vapor-permeable shaft-mounting sole, whereby the shaft-bottom functional layer can be part of a multilayer laminate. The shaft-mounting sole can itself also be formed by the shaft-bottom functional layer constructed with the laminate. The shaft-bottom functional layer, and optionally the shaft functional layer, can be formed by a waterproof, water-vapor-permeable coating or by a waterproof, water-vapor-permeable membrane, whereby either a microporous membrane or a membrane having no pores can be involved. In one embodiment of the invention, the membrane has expanded polytetrafluoroethylene (ePTFE).

Appropriate materials for the waterproof, water-vapor-permeable functional layer are polyurethane, polypropylene, and polyester, including polyether esters and laminates thereof, as described in the documents U.S. Pat. No. 4,725,418 and U.S. Pat. No. 4,493,870. However, microporous expanded polytetrafluoroethylene (ePTFE) is particularly preferred, as described, for example, in documents U.S. Pat. No. 3,953,566 and U.S. Pat. No. 4,187,390, and expanded polytetrafluoroethylene provided with hydrophilic impregnation agents and/or hydrophilic layers; see, for example, document U.S. Pat. No. 4,194,041. "Microporous functional layer" is understood to mean a functional layer, whose average pore size is between about 0.2 µm and about 0.3 µm. The pore size can be measured with a Coulter Porometer (trade name) produced by Coulter Electronics Inc., Hialeah, Fla., USA.

According to a fifth aspect, the invention makes available a method for producing footwear, which, in addition to a water-vapor-permeable composite shoe sole according to the invention, for example, according to one or more of the embodiments stated above for the composite shoe sole, has a shaft that is provided on a shaft-end area on the sole side with a waterproof and water-vapor-permeable shaft-bottom functional layer. In this method, the composite shoe sole and the shaft are prepared first. The shaft is provided on the shaft-end area on the sole side with a waterproof and water-vapor-permeable shaft-bottom functional layer. The composite shoe sole and the shaft-end area provided on the sole side with the shaft-bottom functional layer are joined to each other, so that the shaft bottom functional layer remains unconnected to the shoe-reinforcement material, at least in the area of the at least one opening. This leads to the advantages already explained above.

In one embodiment of this method, the shaft-end area on the sole side is closed with the shaft-bottom functional layer. For the case in which the shaft is provided with a shaft functional layer, a waterproof connection is produced between the shaft functional layer and the shaft-bottom functional layer. This leads to footwear that is waterproof and water-vapor-permeable all around.

The invention, task aspects of the invention, and advantages of the invention will now be further explained with reference to embodiments. In the corresponding drawings:

FIG. 1
shows a sketch of a non-woven material mechanically bonded by needling;

FIG. 2
also shows a sketch of the non-woven material according to FIG. 1 after thermal bonding;

FIG. 4
shows a schematic view of a composite shoe sole, still without shoe-reinforcement material, showing the opening extending through the thickness of the composite shoe sole.

FIG. 5
shows a schematic view of a first example of a shoe-reinforcement unit with a reinforcement device having a bar and a shoe-reinforcement material accommodated in it;

FIG. 6
shows a schematic view of another example of a barrier unit with a reinforcement device and a shoe-reinforcement material;

FIG. 7
shows a schematic view of another example of a barrier unit with a reinforcement device and a shoe-reinforcement material having bars.

FIG. 8
shows a schematic view of another example of a barrier unit with a reinforcement device in the form of at least one bar.

FIG. 9
shows a schematic view of another example of a barrier unit with a reinforcement device and a shoe-reinforcement material.

FIG. 10
shows a schematic view of the composite shoe sole depicted in FIG. 4 with shoe-reinforcement material.

FIG. 15
shows the composite shoe sole depicted in FIG. 14a, in a perspective top view.

FIG. 16 shows the composite shoe sole depicted in FIG. 15, in an exploded view of its individual components, in an oblique perspective view from the top.

FIG. 17 shows the part of the composite shoe sole depicted in FIG. 16, in a perspective oblique view from the bottom.

FIG. 18 shows a forefoot area and a midfoot area of the barrier unit depicted in FIG. 18, in a perspective oblique view from the top, whereby the reinforcement device parts and the shoe-reinforcement material parts are shown separately from one another.

FIG. 19 shows a forefoot area and a midfoot area of the barrier unit depicted in FIG. 17 in another embodiment.

FIG. 20 shows a forefoot area, in a perspective oblique view from the bottom, a modification of the midfoot area of the barrier unit depicted in FIG. 18, whereby only a middle area of this barrier unit part is covered with shoe-reinforcement material and two side parts are formed without passage openings.

Figure 20:
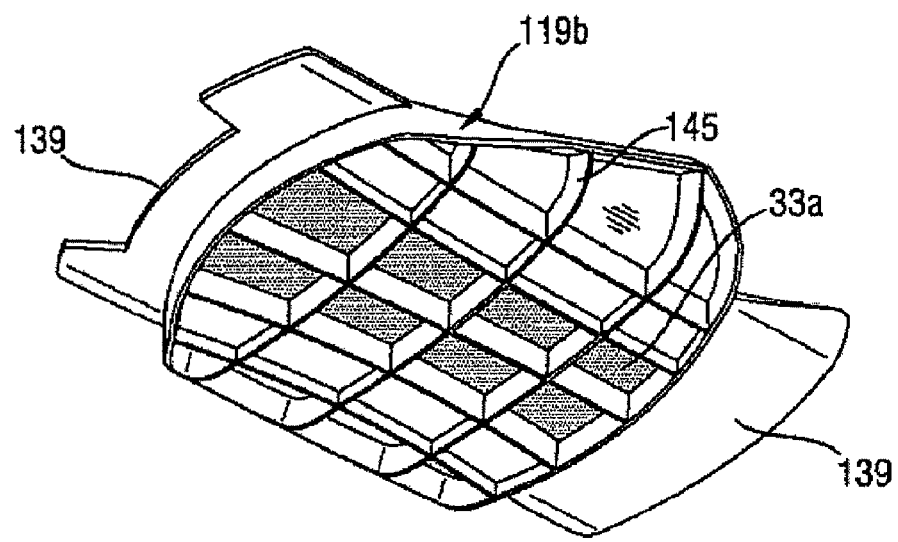

FIG. 21 shows the barrier unit part depicted in FIG. 20, in a view in which the corresponding reinforcement-device part and the corresponding shoe-reinforcement-material part are shown separately from each other.

FIG. 22 shows a schematic sectional view in the forefoot area through a shaft closed on the shaft-bottom side of a first embodiment with a composite shoe sole not yet positioned on the shaft bottom.

FIG. 23 shows a schematic view of another example of the barrier unit with a barrier material and a reinforcement bar during selected bonding with a shaft bottom situated above it.

Figure 22:
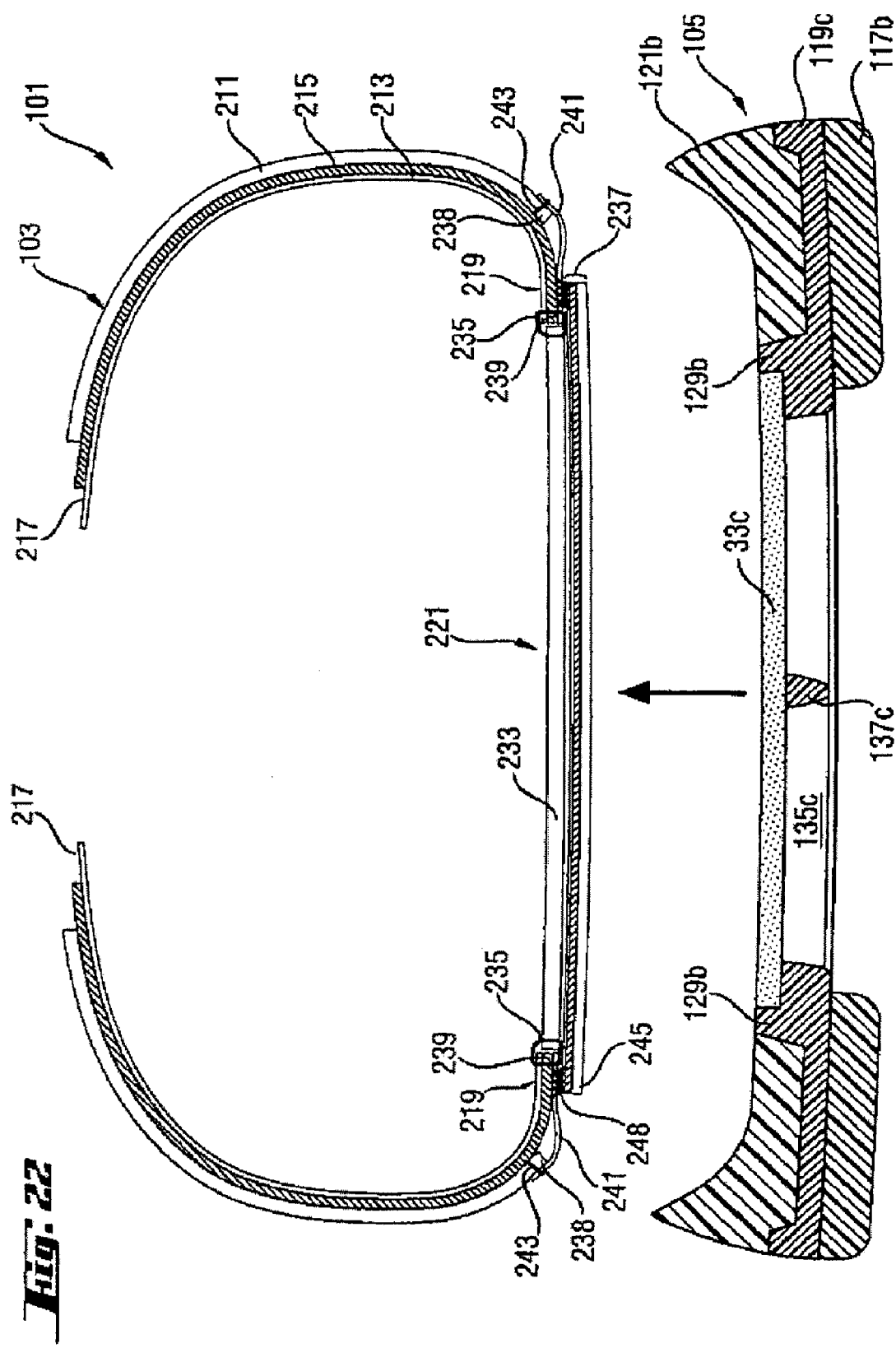

FIG. 24 shows a detail view of the shoe structure depicted in FIG. 22, with a glued-on composite shoe sole.

FIG. 25 shows a detail view of the sole structure depicted in FIG. 22, with a molded-on composite shoe sole.

FIG. 26 shows a shoe structure similar to that shown in FIG. 22, but with a differently constructed shaft bottom, with a composite shoe sole still separated from the shaft.

FIG. 27 shows a detail view of the shoe structure depicted in FIG. 26.

FIG. 28 shows a composite sole in another embodiment.

FIG. 29 shows a composite shoe sole in another embodiment.

An embodiment of a barrier material particularly suited for a composite shoe sole according to the invention will first be explained with reference to FIGS. 1 through 3. Explanations concerning embodiments of a barrier unit according to the invention then follow with reference to FIGS. 4 through 12. Embodiments of the footwear according to the invention and composite shoe soles according to the invention will then be explained by means of FIGS. 13 through 29.

Figure 1:
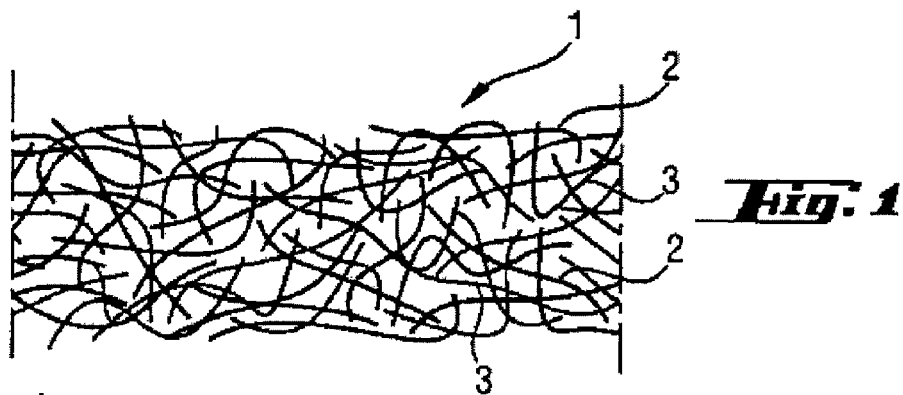
Figure 2:
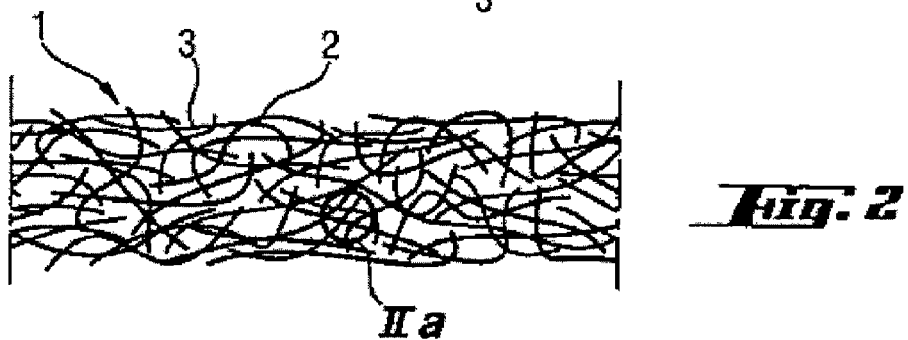
FIG. 2a
shows a cutout, also as a sketch, at a highly enlarged scale, of area IIa of the thermally bonded non-woven material of FIG. 2.
FIG. 2b
shows a cutout, also in a sketch, at an even more enlarged scale, of area IIa, shown in FIG. 2, of the thermally bonded non-woven material of FIG. 2.
Figure 2B:
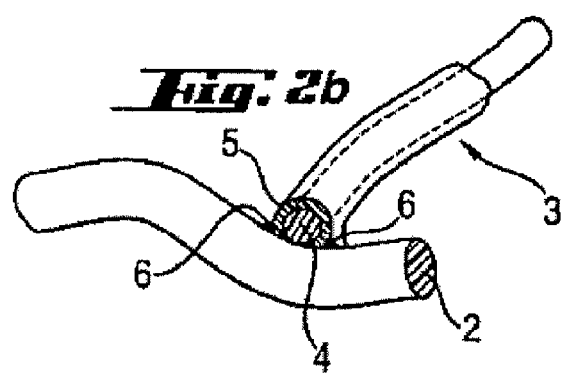
Figure 3:
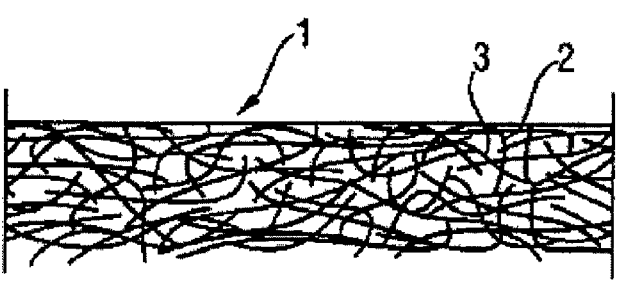
FIG. 3
shows a sketch of the thermally bonded non-woven material depicted in FIG. 2 after additional thermal surface compression.

The embodiment of the barrier material depicted in FIGS. 1 through 3 consists of a fiber composite 1 in the form of a thermally bonded and thermally surface-bonded non-woven material. This fiber composite 1 consists of two fiber components 2, 3, which are each constructed with polyester fibers. A first fiber component 2, which serves as a support component of the fiber composite 1, then has a higher melting point than that of the second fiber component 3, which serves as bonding component. In order to guarantee temperature stability of the entire fiber composite 1 of at least 180° C., specifically in view of the fact that footwear can be exposed to relatively high temperatures during its production, for example, during molding-on of an outsole, in the embodiment considered, polyester fibers with a melting point lying above 180° C. were used for both fiber components. There are various variations of polyester polymers that have different melting points and softening temperatures lying below them. In the embodiment of the barrier material according to the invention being considered, a polyester polymer with a melting point of about 230° C. is chosen for the first component, whereas a polyester polymer with a melting point of about 200° C. is chosen for at least one fiber part of the second fiber component 3. In one embodiment, in which the second fiber component has two fiber parts in the form of a core-shell fiber structure, the core 4 consists of this fiber component of polyester with a softening temperature of about 230° C. and the shell of this fiber component consists of polyester with an adhesive softening temperature of about 200° C. (FIG. 2b). Such a fiber component with two fiber parts of different melting points is also referred to as "bico" for short. This concise term will be used subsequently.

In the embodiment considered, the fibers of the two fiber components are each stable fibers with the above-mentioned special properties. With respect to the total basis weight of the fiber composite of about 400 g/m², the weight fraction of the first fiber component is about 50%. The weight fraction of the second fiber component is also about 50% with respect to the basis weight of the fiber composite 1. The fineness of the first fiber component is about 6.7 dtex, whereas the second fiber component 3, designed as bico, has a higher fineness of 4.4 dtex.

To produce such barrier materials, the fiber components present as staple fibers are first mixed. Several individual layers of this staple fiber mixture are then placed one on top of another in the form of several individual non-woven layers, until the basis weight sought for the fiber composite 1 is reached, in which case a non-woven package is obtained. This non-woven package has only very slight mechanical stability and must therefore pass through a strengthening process.

Initially, mechanical strengthening of the non-woven package occurs by needling by means of a needle technique in which needle bars arranged in a needle matrix penetrate the non-woven package perpendicular to the plane of extension of the non-woven package. Fibers of the non-woven package are reoriented by this from their original position in the non-woven package, so that balling of the fibers and a more stable mechanical structure of the non-woven package occurs. A non-woven material mechanically strengthened by such needling is schematically shown in FIG. 1.

The thickness of the non-woven package compared to the initial thickness of the unneedled non-woven package is already reduced by the needling process. However, the structure obtained by needling is still not permanently tenable, since it is a purely mechanical three-dimensional "hooking" of stable fibers, which can be "unhooked" again under stress.

In order to achieve permanent reinforcement, namely a stabilizing property for use in footwear, the fiber composite 1 according to the invention is treated further. Thermal energy and pressure are then used. In this process, the advantageous composition of the fiber mixture is utilized whereby a temperature is chosen for thermal bonding of the fiber mixture such that it lies at least in the range of the adhesive softening temperature of the shell 5 of the core-shell bico that melts at lower melting point, in order to soften it into a viscous state, so that the fiber parts of the first fiber component, which is situated in the vicinity of the softened mass of the shell 5 of the corresponding bico, can be partially incorporated into this viscous mass. Because of this, the two fiber components are permanently bonded to each other without changing the fundamental structure of the non-woven material. The advantageous properties of this non-woven material can also be utilized, especially its good water-vapor permeability, combined with a permanent mechanical reinforcement property.

Figure 2A:
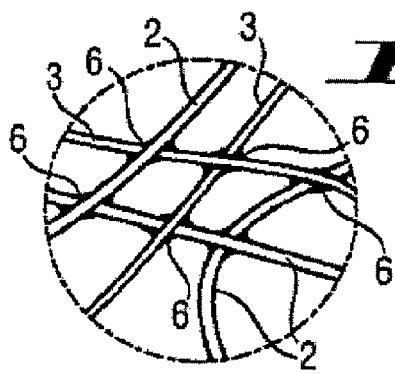

Such a thermally bonded non-woven material is shown schematically in FIG. 2, whereby which a detailed view of a cutout at a highly enlarged scale is shown in FIG. 2*a*, in which the glue bonding points between individual fibers are shown by flat black spots, and FIG. 2*b* shows an area of the cutout at an even larger scale.

In addition to thermal bonding of the non-woven material, thermal surface compression can be performed on at least one surface of the non-woven material by exposing this non-woven material surface simultaneously to the effects of pressure and temperature, for example, by means of heating compression plates or compression rollers. The result is even stronger bonding than in the remaining volume of the non-woven material and smoothing of the thermally compressed surface.

A non-woven material initially mechanically bonded by needling, then thermally bonded, and finally thermally surface compressed on one of its surfaces, is shown schematically in FIG. 3.

In an accompanying comparison table, different materials, including barrier materials according to the invention, are compared with respect to some parameters. Split sole leather, two only needle-bonded non-woven materials, a needle-bonded and thermally bonded non-woven material, and finally a needle-bonded, thermally bonded and thermally surface-compressed non-woven material are then considered, in which these materials, in the comparison table, for simplicity of the subsequent treatment of the comparison table, are assigned material numbers 1 to 5.

The longitudinal-elongation values and the transverse-elongation values show percentage by which the corresponding material expands when acted upon with a stretching force of 50 N, 100 N, or 150 N. The lower this longitudinal and transverse elongation, the more stable the material is and the better suited it is as a barrier material. If the corresponding material is used as a barrier material to protect the membrane against penetration of foreign objects, such as pebbles, puncture resistance is important. The abrasion strength, called abrasion in the comparison table, is also significant for use of the corresponding material in a composite shoe sole.

It can be deduced from the comparison table that split sole leather does have high tensile strength, relatively good resistance to stretching forces, and high puncture resistance, but it has only moderate abrasion strength during wet tests, especially quite moderate water-vapor permeability.

The non-woven materials that are only needle-bonded (material 2 and material 3) are relatively light and have high water-vapor permeability in comparison with leather, but they have relatively low stretching resistance in terms of stretching forces, possess only limited puncture resistance, and have only moderate abrasion strength.

The needle-bonded and thermally bonded non-woven material (material 4), has a higher basis weight than materials 2 and 3 at a lower thickness, and is therefore more compact. The water-vapor permeability of material 4 is higher than that of material 2 and about as high as that of material 3, but almost three times as high as that of leather according to material 1.

The longitudinal and transverse elongation resistances of material 4 are much higher than those of the non-woven materials 2 and 3, which are only needle-bonded, and the longitudinal and transverse loads to break are also much higher than for materials 2 and 3. The puncture resistance and abrasion strength in material 4 are also much higher than in materials 2 and 3.

Material 5, i.e., a needle-bonded and thermally bonded non-woven material thermally compressed on one of its surfaces, has a lower thickness than material 4, because of thermal surface compression with the same basis weight, and therefore takes up less room in a composite shoe sole. The water-vapor permeability of the material 5 still lies above that of material 4. With respect to elongation resistance, material 5 is also superior to material 4, since it shows no elongation at applied longitudinal and transverse elongation forces of 50 N to 150 N. The tensile strength is higher with respect to longitudinal loading and lower with respect to transverse loading than that of material 4. The puncture resistance is somewhat below that of material 4, which is caused by the more limited thickness of material 5. A special superiority compared to all materials 1 to 4 is exhibited by material 5 with respect to abrasion strength.

The comparison table therefore shows that when high water-vapor permeability, high shape stability, and therefore a reinforcement effect and high abrasion resistance are important in the shoe-reinforcement material, material 4 and especially material 5 are quite particularly suited.

In the case of material 5, in one embodiment of the invention, the needle-bonded and thermally bonded non-woven material, which also has very good reinforcement, is then subjected to hydrophobic finishing, for example, by a dipping process in a liquid that causes hydrophobization, in order to minimize the suction effects of the non-woven material. After the hydrophobization bath, the non-woven material is dried under the influence of heat, during which the hydrophobic property of the applied finishing is further improved. After the drying process, the non-woven material passes through sizing rollers, in which a final thickness of, say, 1.5 mm is set.

In order to achieve a particularly smooth surface, the non-woven material is then exposed to temperature and pressure again, in order to melt the fiber parts, namely the second fiber component in the shell of the bico on the surface of the non-woven and to press it against a very smooth surface by means of pressure applied simultaneously. This occurs either with appropriate calendering devices or by means of a heated compression die, whereby a separation material layer can be introduced between the non-woven and the heated pressure plate, which can be silicone paper or Teflon, for example.

Surface smoothing by thermal surface compression is performed on only one area of both surfaces of the non-woven material, depending on the desired properties of the barrier material.

As already shown by the comparison table, the non-woven material so produced has high stability against a tearing load and possesses good puncture resistance, which is important when the material is used as a barrier material to protect a membrane.

The material 5 just described represents a first embodiment example of the barrier material used according to the invention, in which both fiber components consist of polyester, both fiber components have a weight percentage of 50% in the total fiber composite, and the second fiber component is a polyester core-shell fiber of the bico type.

Additional embodiment examples of the barrier material used according to the invention will now be considered briefly:

EMBODIMENT EXAMPLE 2

A shoe-reinforcement material in which both fiber components consist of polyester and have a weight percentage of 50% each in the total fiber composite, and the second fiber component is a bico of polyester of the side-by-side type.

Except for the special bico structure, the shoe-reinforcement material according to embodiment example 2 is produced in the same way and has the same properties as the shoe-reinforcement material according to embodiment example 1 with a bico fiber of the core-shell type.

EMBODIMENT EXAMPLE 3

A shoe reinforcement material, in which both fiber components each have a weight percentage of 50% and the first fiber component 2 is a polyester and the second fiber 3 component is a polypropylene.

In this embodiment example, no bico is used, but a single-component fiber is used instead as second fiber component. For production of the fiber composite, only two fiber components with different melting points are chosen. In this case, the polyester fiber (with a melting point of about 230° C.) with a weight fraction of 50% represents the support component, whereas the polypropylene fiber, also with a weight fraction of 50%, has a lower melting point of about 130° C. and therefore represents the gluable bonding component. The production process otherwise runs as in embodiment example 1. In comparison with embodiment example 2, the non-woven according to embodiment example 3 has lower heat stability, but it can also be produced using lower temperatures.

EMBODIMENT EXAMPLE 4

A shoe-reinforcement material with a percentage of 80% polyester as the first fiber component 2 and a polyester core-shell bico as the second fiber component 3.

In this embodiment example, production again occurs as in embodiment example 1, the only difference being that the percentage of second fiber component forming the bonding component is changed. Its weight percentage is now only 20% compared to 80% of the weight formed by the first fiber component 2, which has a higher melting point. Because of the proportionate reduction in bonding component, the stabilizing effect of the obtained shoe-reinforcement material is reduced. This can be advantageous when a non-woven material with high mechanical lifetime combined with increased flexibility is required. The temperature resistance of this non-woven material corresponds to that of the first embodiment example.

Some embodiment examples of a composite shoe sole and a barrier unit and details of it are now considered by means of FIGS. 4 through 12.

FIG. 4 shows a partial cross-section through a composite shoe sole 21 with an underlying outsole 23 and a shoe-reinforcement device 25 situated above it, before this composite shoe sole 21 is provided with a barrier material. The outsole 23 and the shoe-reinforcement device 25 each have openings 27 and 29, which together form a passage 31 through the total thickness of the composite shoe sole 21. The passage 31 is therefore formed by the intersection surface of the two passage openings 27, 29. To complete this composite shoe sole 21, barrier material 33 (not shown in FIG. 4) is placed in the passage opening 29 or arranged above it.

FIG. 5 shows an example of a barrier unit 35 with a piece of barrier material 33 held by a reinforcement device 25.

In one embodiment, the reinforcement device is molded around the peripheral area of the piece of barrier material 33 or molded onto it, so that the material of the reinforcement device 25 penetrates into the fiber structure of the barrier material 33 and is cured there and forms a solid composite.

As a material for molding the reinforcement device or molding onto the reinforcement device, thermoplastic polyurethane (TPU) is suitable, which leads to very good enclosure of the barrier material, and is well bonded to it.

In another embodiment, the shoe-reinforcement material 33 is glued to the reinforcement device 25. The reinforcement device 25 preferably has a reinforcement frame 147 that stabilizes at least the composite shoe sole 21.

FIG. 6 shows a barrier unit 35 in which a piece of barrier material 33 is enclosed by a reinforcement device 25 in the sense that the edge area of the barrier material 33 is not only surrounded by the reinforcement device 25, but also held on both surfaces.

FIG. 7 shows a barrier unit 35 in which a piece of stabilizing material 33 is held by a reinforcement device 25. The shoe-reinforcement material 33 is provided on at least on one surface with at least one reinforcement bar, which at least partially bridges the area of the opening. The at least one reinforcement bar 37 is preferably arranged on a bottom facing the outsole.

FIG. 8 shows a barrier unit 35 in which a piece of shoe-reinforcement material 33 is provided with a reinforcement device 25 in the form of at least one reinforcement bar 37. The reinforcement bar 37 is arranged on at least one surface of the shoe-reinforcement material 33, preferably on the surface directed downward toward the outsole 23.

FIG. 9 shows a barrier unit 35 in which a piece of shoe-reinforcement material 33 is provided with a reinforcement device 25, so that the shoe-reinforcement material 33 is applied to at least one surface of the reinforcement device 25. The shoe-reinforcement material 33 then covers the passage opening 29.

FIG. 10 shows a composite shoe sole 21 according to FIG. 4 that has a barrier unit 35 according to FIG. 5 above the outsole 23.

For all the above described embodiments according to FIGS. 4 through 10, it is true that the bonding material during molding on, molding around, or gluing between the barrier material 33 and the reinforcement device 25 not only adheres to the surfaces being joined, but also penetrates into the fiber structure and cures there. The fiber structure is therefore additionally strengthened in its joining area.

Figure 11:
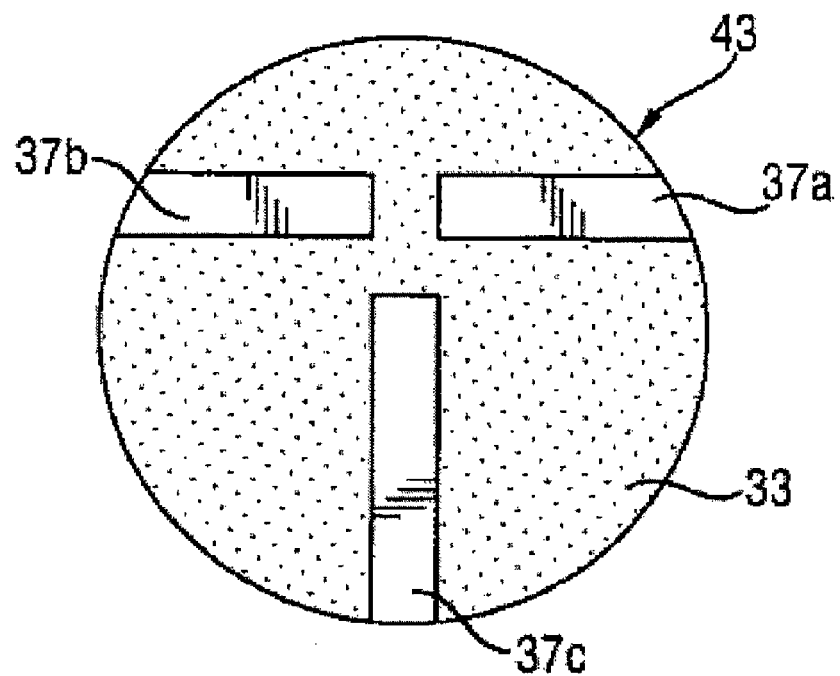
FIG. 11
shows a schematic view of a reinforcement mesh arranged on the bottom of barrier material
Figure 12:
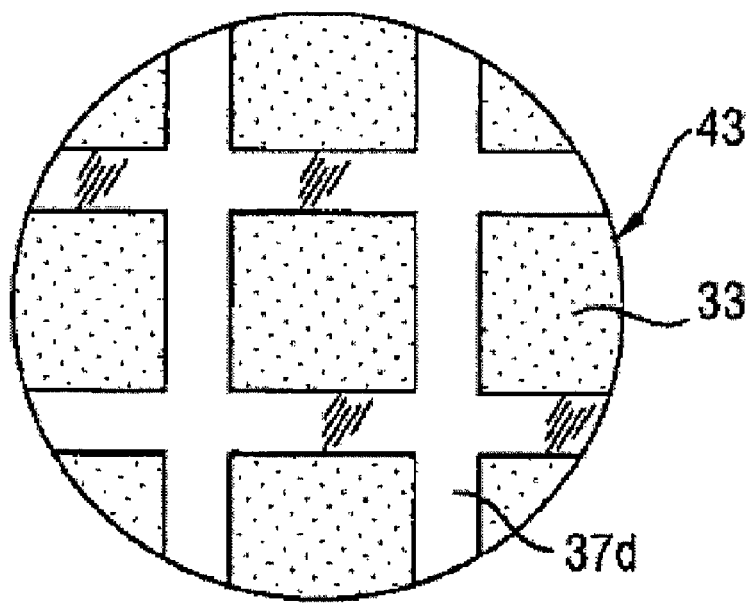
FIG. 12
shows a schematic view of a reinforcement mesh arranged on the bottom of shoe-reinforcement material.

Two embodiments of reinforcement-bar patterns of reinforcement bars 37 applied to a surface of the barrier material 33 are shown in FIGS. 11 and 12. Whereas in the case of FIG. 11, three individual bars 37a, 37b, and 37c are arranged in a T-shaped mutual arrangement on a circular surface 43, for example, the bottom of barrier material 33, which corresponds to a through hole of the composite shoe sole 21, for example, by gluing onto the bottom of the barrier material, in the case of FIG. 12, a reinforcement bar device in the form of a reinforcement mesh 37d is provided.

Embodiments of shoes designed according to the invention will now be explained with reference to FIGS. 13 through 29, whereby their individual components will also be considered, especially in connection with the corresponding composite shoe sole 21.

Figure 13:
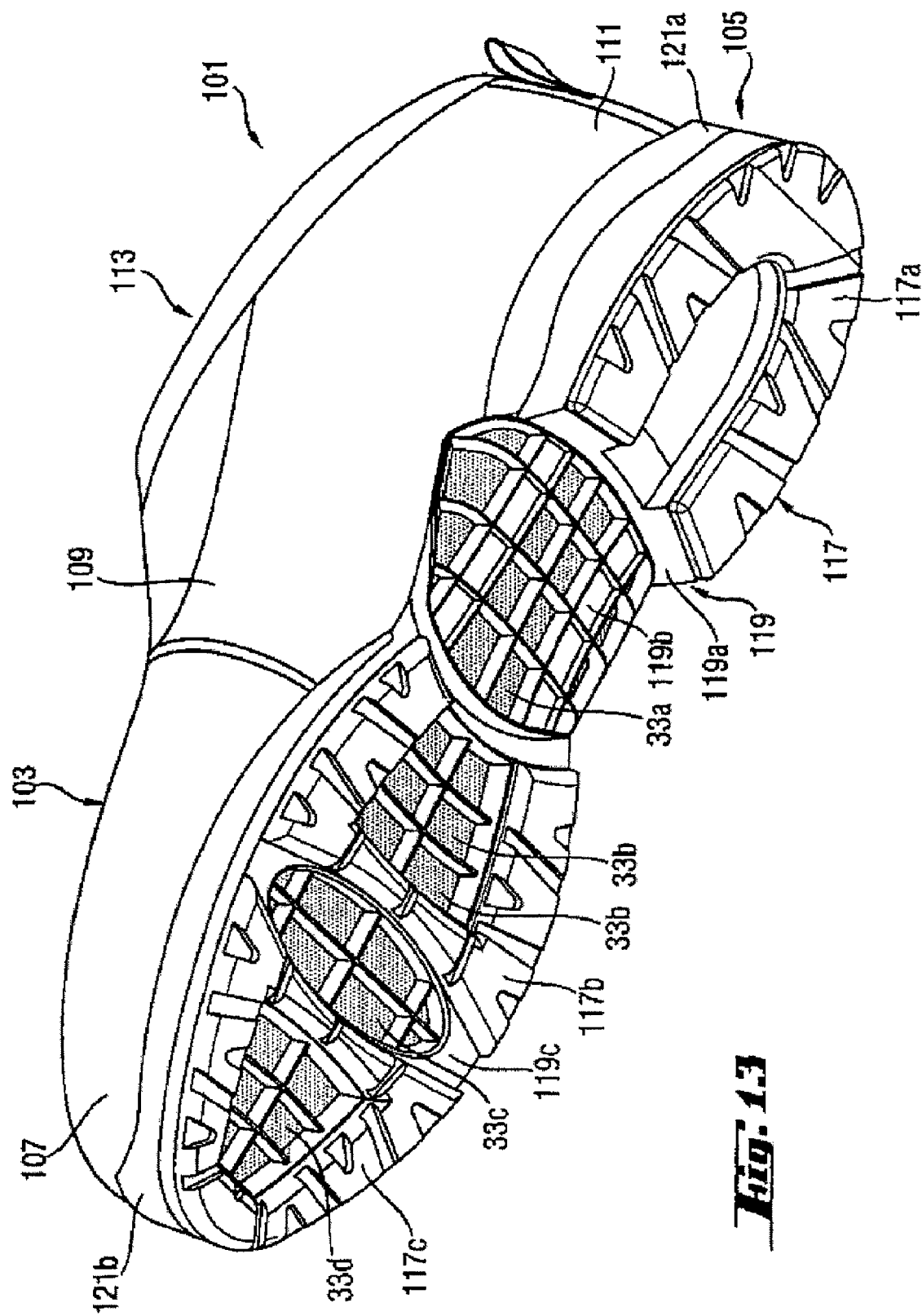
FIG. 13
shows a schematic view of a reinforcement mesh arranged on the bottom of shoe-reinforcement material.

FIG. 13 shows, in a perspective oblique view from the bottom, an embodiment example of a shoe 101 according to the invention with a shaft 103 and a composite shoe sole 105 according to the invention. The shoe 101 has a forefoot area 107, a midfoot area 109, a heel area 111, and a foot-insertion opening 113. The composite shoe sole 105 has a multipart outsole 117 on its bottom, which has an outsole part 117a in the heel area, an outsole part 117b in the area of the ball of the foot, and an outsole part 117c in the toe area of the composite shoe sole 105. These outsole parts 117 are attached to the bottom of a reinforcement device 119 that has a heel area 119a, a midfoot area 119b, and a forefoot area 119c. The composite shoe sole 105 will be further explained in detail with reference to the following diagrams.

Additional components of the composite shoe sole 105 can be damping sole parts 121a and 121b, which are applied in the heel area 111 and in the forefoot area 107 on the top of the reinforcement device 119. The outsole 117 and the reinforcement device 119 have passage openings that form through holes through the composite shoe sole. These through holes are covered by barrier materials 33a-33d in a water-vapor-permeable manner.

Figure 14A:
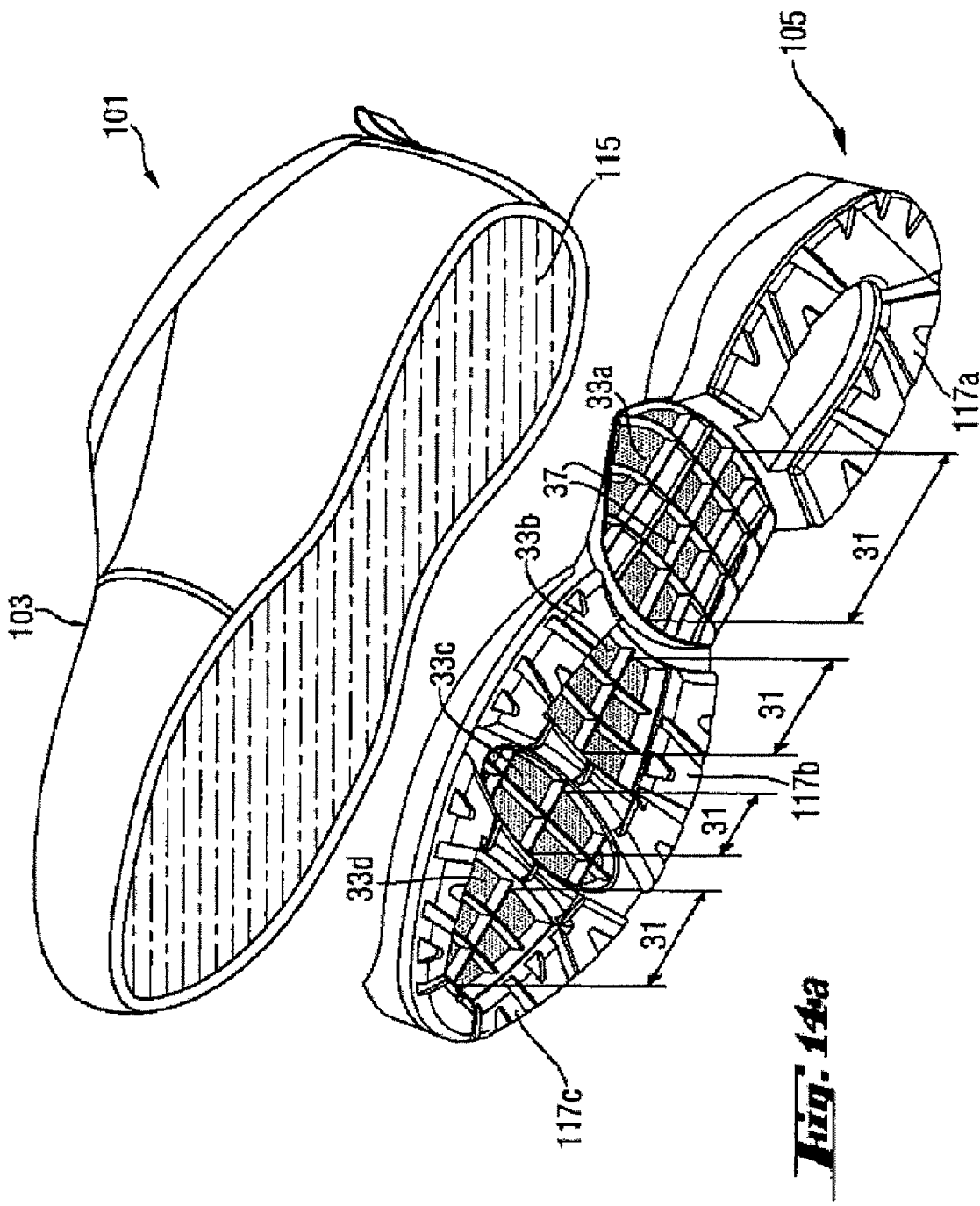
FIG. 14a
shows the shoe depicted in FIG. 13, but before a composite shoe sole according to the invention is placed on a shaft bottom of the shoe.

FIG. 14a shows the shoe 101 according to FIG. 13 in a manufacturing stage in which the shaft 103 and the composite shoe sole 105 are still separate from each other. The shaft 103 is provided on its lower end area on the sole side with a shaft bottom 221 that has a waterproof, water-vapor-permeable shaft-bottom functional layer, which can be a waterproof, water-vapor-permeable membrane. The functional layer is preferably a component of a multilayer functional-layer laminate that has at least one protective layer, for example, a textile backing, as processing protection, in addition to the functional layer. The shaft bottom 115 can also be provided with a shaft-mounting sole. However, there is also the possibility of assigning the function of shaft-mounting sole to the functional-layer laminate. The composite shoe sole also has the through holes 31 already mentioned in FIG. 8, which are covered with barrier material parts 33a-33d. The bars 37 are shown within the peripheral edge of the corresponding through holes. In other embodiments, three through holes or two through holes or one through hole can be provided. In another embodiment, more than four through holes are provided. The composite shoe sole 105 can be attached to the shaft end on the sole side either by molding on or gluing, in order to produce the state according to FIG. 12. For a detailed explanation of the functional layer and its laminate and the connection with the mounting sole, the description and FIGS. 22 through 27 are referred to.

Figure 14B:
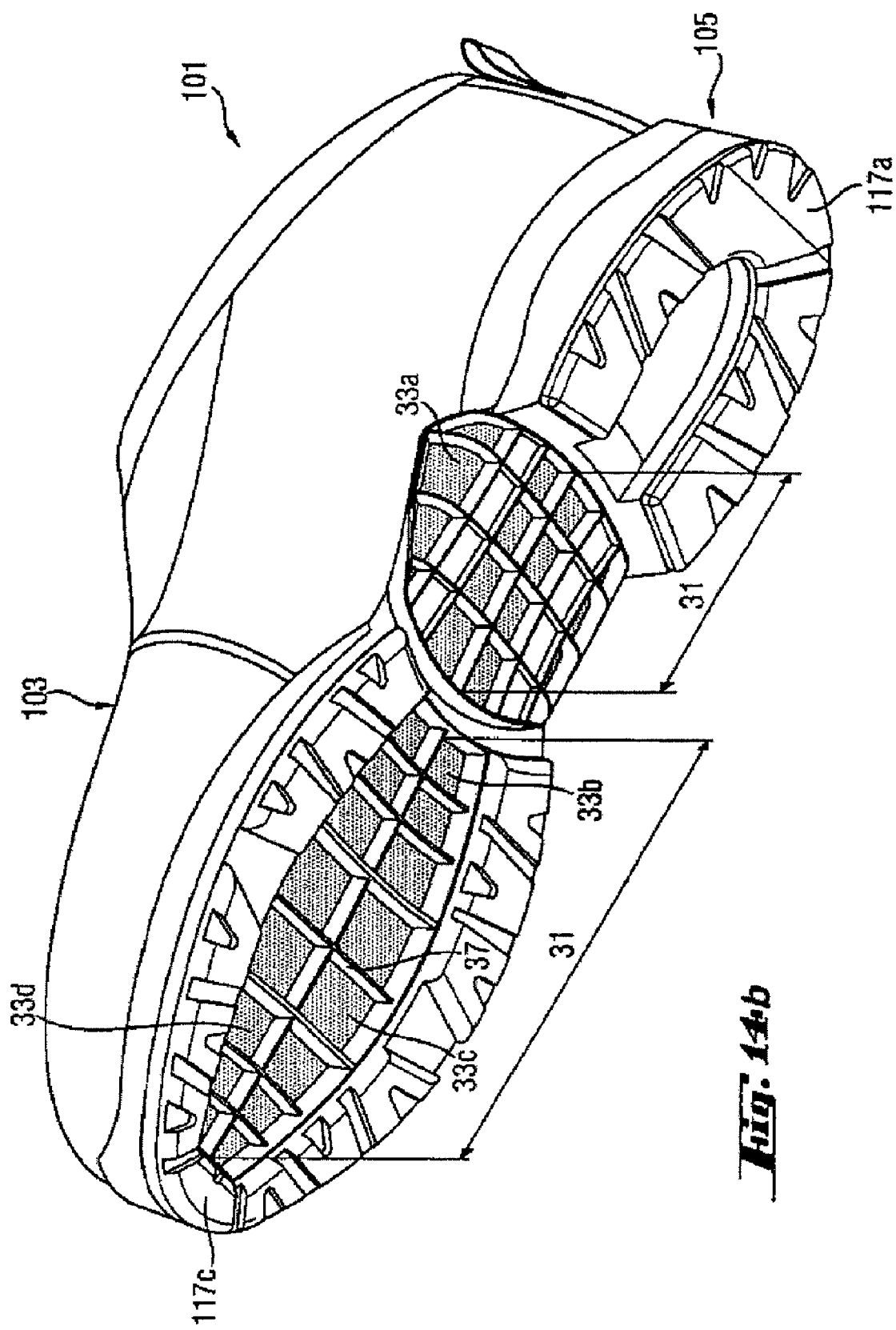
FIG. 14b
Shows the shoe depicted in FIG. 13 provided with another example of a composite sole according to the invention.

FIG. 14b shows the same shoe structure as in FIG. 14a, with the difference that the shoe in FIG. 13a has four through holes 31, whereas the shoe according to FIG. 14b is equipped with two through holes 31. It can be seen here that the bars 37 are arranged within the peripheral edge of the corresponding through hole 31 and do not form a limitation of the through hole 31. The area of a through hole is determined minus the total area of the bars bridging it, since this bar surface blocks water-vapor transport.

Figure 14C:
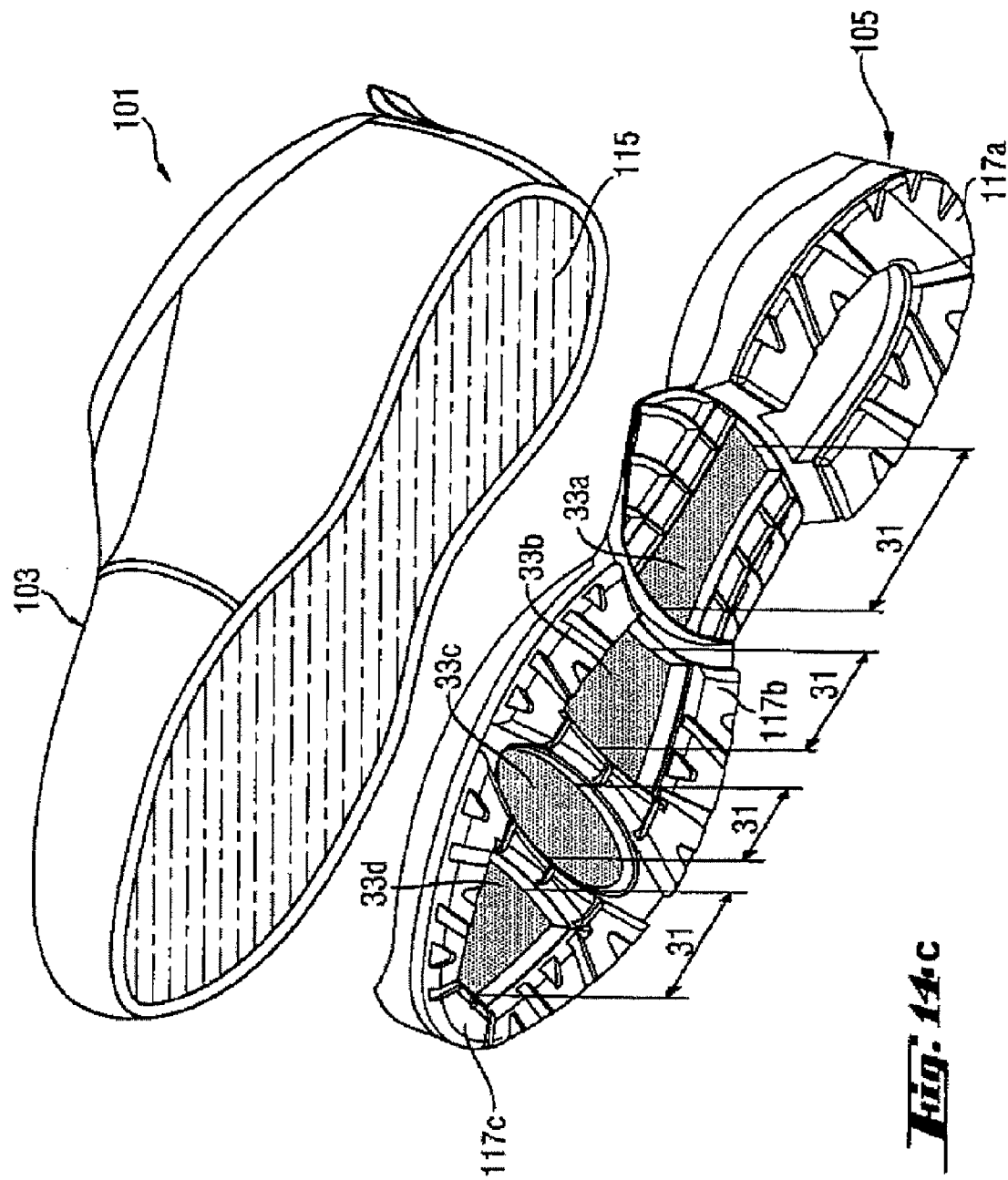
FIG. 14c
shows the shoe depicted in FIG. 13 provided with another example of a composite sole according to the invention.

FIG. 14c also shows the same shoe structure as in FIG. 14a, in which the four through holes 31 in this embodiment are free of reinforcement bars 37. The through holes 31 can then be closed, as in FIGS. 14a and 14b, with one or more pieces of reinforcement material 33.

FIG. 15 shows a composite shoe sole 105 with a top lying away from the outsole 117. The reinforcement device 119 is covered in its middle area 119b and its forefoot area 119c with several pieces 33a, 33b, 33c, and 33d of the barrier material 33 with which through holes of the composite shoe sole 105 not visible in FIG. 15 are covered. In the heel area and in the forefoot area of the composite shoe sole 105, a damping sole part 121a and 121b is applied to the top of the reinforcement device 119, essentially over the entire surface in the heel area and with recesses in the forefoot area wherever the barrier material parts 33b, 33c and 33d are situated.

Since the outsole parts of the outsole 117, the reinforcement device 119, and the damping sole parts 121a and 121b have different functions within the composite shoe sole, they are appropriately also constructed with different materials. The outsole parts that are supposed to have good abrasion resistance, consist, for example, of a thermoplastic polyurethane (TPU) or rubber. "Thermoplastic polyurethane" is the term for a number of different polyurethanes that can have different properties. For an outsole, a thermoplastic polyurethane can be chosen with high stability and slip resistance. The damping sole parts 121a and 121b, which are supposed to produce shock absorption during walking movements of the user of the shoe, consist of correspondingly elastically compliant material, for example, ethylene-vinyl acetate (EVA) or polyurethane (PU). The reinforcement device 119, which serves as a holder for the non-coherent outsole parts 117a, 117b, 117c and for the also non-coherent damping sole parts 121a, 121b and serves as a reinforcement element for the entire composite shoe sole 105, and is supposed to have corresponding elastic rigidity, consists of at least one thermoplastic material. Examples of appropriate thermoplastics are polyethylene, polyamide, polyamide (PA), polyester (PET), polyethylene (PE), polypropylene (PP), and polyvinylchloride (PVC). Other appropriate materials are rubber, thermoplastic rubber (TR), and polyurethane (PU). Thermoplastic polyurethane (TPU) is also suitable.

The composite shoe sole depicted in FIG. 15 is shown in an exploded view in FIG. 16, i.e., in a view in which the individual parts of the composite shoe sole 105 are shown separately from one another, except for the shoe-reinforcement material parts 33a, 33b, 33c, and 33d, which are already shown arranged on the reinforcement device parts 119b and 119c. In the embodiment depicted in FIG. 16, the reinforcement device 119 has its parts 119a, 119b, and 119c as initially separate parts that are joined to one another to reinforcement device 119 during assembly of the composite shoe sole 105, which can occur by welding or gluing of the three reinforcement-device parts to one another. As will still be explained in conjunction with FIG. 19, openings are situated beneath the barrier material parts, which, together with openings 123a, 123b, and 123c in the outsole parts 117a, 117b, and 117c, form through holes 30 of the type already explained in connection with FIG. 4, and whereby barrier material parts 33a-33d are covered in a water-vapor-permeable manner. A passage opening 125 in the heel part 119a of the reinforcement device 119 is not closed with barrier material 33, but with the full-surface damping sole part 121a. A better damping effect on the composite shoe sole 105 in the heel area of the shoe is thereby achieved, where sweat moisture removal, under some circumstances, can be less required, since foot sweat mostly forms in the forefoot and midfoot area, but not in the heel area.

The damping sole part 121b is provided with passage openings 127a, 127b, and 127c, dimensioned so that the shoe-reinforcement material parts 33b, 33c, 33d can be accommodated within an enclosing limitation edge 129a, 129b, or 129c of the reinforcement device part 119c in the passage openings 127a, 127b, and 127c.

In another embodiment, no damping sole part 121 is proposed. In this case, the parts of the reinforcement device 119a, 119b, and 119c have a flat surface without a limitation edge 129a, 129b, 129c, so that the shoe-reinforcement material 33 is positioned flush with the surface of the reinforcement device in its openings. The composite sole is only formed by the barrier unit, constructed from the shoe-reinforcement unit 33 and the reinforcement device 119, and the outsole.

The composite shoe-sole parts 105 shown in FIG. 16 are shown obliquely in FIG. 17 in an arrangement separate from one another, but in an oblique view from the bottom. It can be seen that the outsole parts 117a to 117c are provided in the usual manner with an outsole profile, in order to reduce the danger of slipping. The bottoms of the reinforcement-device parts 119a and 119e on their bottom also have several knob-like protrusions 131, which serve to accommodate complementary recesses to be seen in FIG. 16 in the tops of outsole parts 117a, 117b, and 117c for positionally correct joining of the outsole parts 117a to 117c to the corresponding reinforcement-device parts 119a and 119c. Openings 135a, 135b, 135c, and 135d are also visible in the reinforcement-device parts 119b and 119d in FIG. 17, which are covered with the corresponding shoe-reinforcement material 33a, 33b, 33c, and 33d in a water-vapor-permeable manner, so that the through holes 31 (FIG. 4) of the composite shoe sole 105 are closed in a water-vapor-permeable manner. In one embodiment, the barrier materials are arranged in such a way that their smooth surfaces are directed toward the outsole. The openings 135a to 135d are each bridged with a reinforcement mesh 137a, 137b, 137c, and 137e, which form a reinforcement structure in the area of the corresponding opening of the reinforcement device 119. These reinforcement meshes 137a-137e also act against the penetration of larger foreign objects up to the shoe-reinforcement material 33 or even farther, which could be felt as unpleasant by the user of the shoe.

In another embodiment, the barrier unit is additionally formed as an outsole with an outsole profile.

Connection elements 139 provided on the axial ends of the reinforcement part 119b on the midfoot side, must also be mentioned, which, during assembly of the reinforcement device 119 from the three reinforcement device parts 119a to 119c, can lie overlapping on the upper side of the reinforcement device parts 119a and 119c facing away from the outsole application side, in order to be attached there, for example, by welding or gluing.

FIG. 18 shows the two reinforcement device parts 119a and 119b, in an enlarged view compared to FIG. 17, before being attached to one another, whereby the openings 135b to 135d of the reinforcement device part 119c on the forefoot side and the reinforcement mesh structure situated in it can be seen particularly apparent. It is also clear that the middle reinforcement device part 119b shows a raised frame and mesh parts on the longitudinal sides. The shoe-reinforcement material piece 33a to be placed on the reinforcement device part 119b is provided on its long sides with correspondingly raised side wings 141. Through these raised parts, both the shoe-reinforcement part 119b and the barrier-material piece 33a, an adjustment to the shape of the lateral midfoot flanks is achieved. The remaining shoe-reinforcement material parts 33b to 33d are essentially flat, corresponding to the essentially flat design of the reinforcement device part 119c on the forefoot side.

FIG. 19 shows another embodiment of the forefoot area 107 and the midfoot area 109 according to FIG. 17. Here, the reinforcement device 119 is formed without reinforcement bars 37. The area of the reinforcement material 33 is then closed off flatly with the surface of the reinforcement device 119. The openings 135a-d are each equipped with continuous support protrusions 150 to accommodate the reinforcement material 33 so that it can be fit into the openings 135a-d.

It should be added in general here that the at least one opening 135a-135d of the reinforcement device 119b and 119c is bounded by the frame 147 of the reinforcement device 119 and not by the bars 37 present in the openings 135a-135d. The limitation edges 129a-129c, depicted in FIG. 17 in this embodiment, represent part of the corresponding frame 147.

It is also possible, instead of several shoe-reinforcement material parts 33b, 33c, 33d, to use a one-piece shoe-reinforcement material part. The mounting protrusions 150 and/or limitation edges 129a-129c must be configured accordingly.

Figure 21:
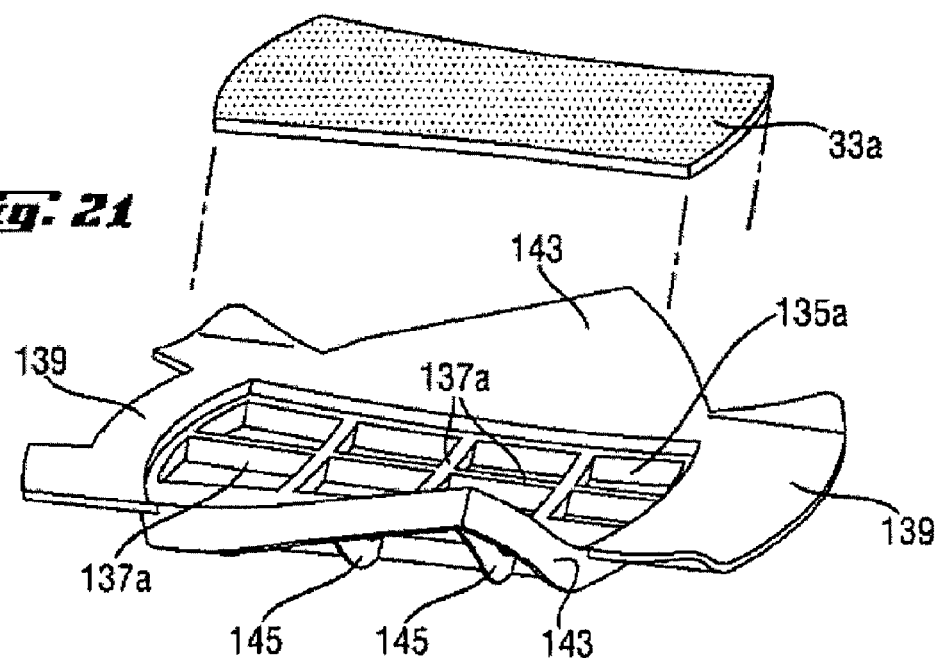

Another modification of the barrier-unit part provided for the midfoot area with the reinforcement device part 119b and the shoe-reinforcement material part 33a is shown in FIGS. 20 and 21, in FIG. 20 in the finished mounted state and in FIG. 21 while these two parts are still separate from each other. In contrast to the embodiment in FIGS. 18 and 19, in the modification of FIGS. 21 and 20, the reinforcement part 119b provided for the midfoot area is provided in the middle area only with an opening and a reinforcement mesh 137a situated in it, whereas the two wing parts 143 on the long sides of the reinforcement device part 119b are designed to be continuous, i.e., have no opening, but are only provided on their bottom with reinforcement ribs 145. The shoe-reinforcement material piece 33a provided for this barrier-unit part is accordingly narrower than in the embodiments of FIGS. 18 to 19, because it does not require the side wings 141 according to FIGS. 18 and 19.

While embodiments of the composite shoe sole according to the invention 105 were explained with reference to FIGS. 15 through 21, embodiments in details of footwear according to the invention will now be explained with reference to FIGS. 22 through 29, the footwear being constructed with the composite shoe sole according to the invention. FIGS. 22, 24, and 25 show a embodiment of the footwear according to the invention in which the shaft bottom has a shaft-mounting sole and also a functional-layer laminate, while FIGS. 26 and 27 show a embodiment of footwear according to the invention in which a shaft-bottom functional layer laminate 237 simultaneously assumes the function of shaft-mounting sole 233. FIG. 28 shows another embodiment of the composite shoe sole 105.

In the two embodiments depicted in FIGS. 22 through 27, the shoe 101, in agreement with FIGS. 13 and 14a-c, has a shaft 103, which has an outer material layer 211 situated on the outside, a liner layer 213 situated on the inside, and a waterproof, water-vapor-permeable shaft functional layer 215 situated in between, for example, in the form of a membrane. The shaft functional layer 215 can be present in connection with the lining layer 213 as a two-ply laminate or as a three-ply laminate, whereby the shaft functional layer 215 is embedded between the liner layer 213 and a textile backing 214. The upper shaft end 217, depending on whether the sectional plane of the cross-sectional view depicted in FIGS. 22 and 26 lies in the forefoot area or midfoot area, is closed or open with respect to the foot-insertion opening 113 (FIG. 13). On the shaft-end area 219 on the sole side, the shaft 103 is provided with a shaft bottom 221, with which the lower end of the shaft 103 on the sole side is closed. The shaft bottom 221 has a shaft-mounting sole 223 that is connected to the shaft-end area 219 on the sole side, which occurs in the embodiments according to FIGS. 22 through 27 by means of a Strobel seam.

In the case of the embodiments of FIGS. 22, 24, and 25, in addition to the shaft-mounting sole 233, a shaft-bottom functional layer laminate 237 is provided that is arranged beneath the shaft-mounting sole 233 and extends beyond the periphery of the shaft-mounting sole 233 into the shaft-end area 219 on the sole side. The shaft-bottom functional layer laminate 237 can be a three-ply laminate in which the shaft bottom functional layer 248 is embedded between a textile backing and another textile layer. It is also possible to provide the shaft-bottom functional layer 247 only with the textile backing. The outer material layer 211 in the shaft end area 219 on the sole side is shorter than the shaft functional layer 215, so that a protrusion of the shaft functional layer 215 with respect to the outer material layer 211 is created there and exposes the outer surface of the shaft functional layer 215. Mostly for mechanical tension relief of the protrusion of the shaft functional layer 215, a mesh band 241 or another material that can be penetrated with sealant is arranged between the end 238 of the outer material layer 211 on the sole side and the end 239 of the shaft functional layer 215 on the sole side, the long side of which, facing away from the Strobel seam 237, is joined by means of a first seam 243 to the end 238 of the outer material layer 211 on the sole side, but not to the shaft functional layer 215, and whose long side, facing the Strobel seam 235, is joined by means of Strobel seam 235 to the end 239 of the shaft functional layer 215 on the sole side and to the shaft-mounting sole 233. The mesh band 241 preferably consists of a monofilament material, so that it has no water conductivity. The mesh band is preferably used for molded-on soles. If the composite sole is attached to the shaft by means of glue instead of the mesh band, the end 238 of the outer material layer 211 on the sole side can be attached by means of glue 249 to the lasting-shaft functional-layer laminate (FIG. 24). In the peripheral area 245, in which the shaft bottom functional layer laminate 237 protrudes beyond the periphery of the shaft mounting sole 233, a sealing material 248 is arranged between the shaft-bottom functional layer 237 and the end 239 of the shaft functional layer 215 on the sole side, by means of which a waterproof connection is produced between the end 239 of the shaft functional layer 215 on the sole side and the peripheral layer 245 of the shaft-bottom functional-layer laminate 237, this seal acting through the mesh band 241. The mesh band solution depicted in FIGS. 22, and 25 through 27 serves to prevent water that runs down or creeps down on the outer material layer 211 from reaching the Strobel seam 235 and advancing into the shoe interior from there. This is prevented by the fact that the end 238 of the outer material layer 211 on the sole side ends at a spacing from the end 239 of the shaft functional layer 215 on the sole side, which is bridged with the non-water-conducting mesh band 241, and the sealing material 248 is provided in the area of the protrusion of the shaft functional layer 215. The mesh band solution is known from document EP 0,298,360 B1.

Instead of the mesh band solution, all joining technologies used in the shoe industry for preferably waterproof joining of a shaft to the shaft bottom can be used. The depicted mesh band solution in FIGS. 22, 25-27 and the lasted solution in FIG. 24 are examples of embodiments.

The shaft structure depicted in FIG. 26 agrees with the shaft structure shown in FIG. 22, with the exception that no separate shaft mounting sole is provided there, but the shaft bottom functional layer laminate 237 simultaneously assumes the function of a shaft mounting sole 233. According to it, the periphery of the shaft bottom functional layer laminate 237 of the embodiment depicted in FIG. 26 is connected via Strobel seam 235 to the end 239 on the sole side of the shaft functional layer 215 and the sealing material 248 is applied in the area of the Strobel seam 235, so that the transition between the end 239 on the sole side of the shaft functional layer 215 and the peripheral area of the shaft-bottom functional layer laminate 237 is sealed completely, including the Strobel seam 235.

In both embodiments of FIGS. 22 and 26, an identically constructed composite shoe sole 105 can be used, as shown in these two diagrams. Since sectional views of shoes 101 are shown in the forefoot area in FIGS. 22 and 26, these diagrams are a sectional view of the forefoot area of the composite shoe sole 105, i.e., a sectional view along an intersection line running across the reinforcement unit part 119c intended for the forefoot area, with barrier material piece 33c inserted in its openings 135c.

The sectional view of the composite shoe sole 105 accordingly shows the reinforcement device part 119c with its opening 135c, a bar of the corresponding reinforcement mesh 137c bridging this opening, the outward protruding frame 129b, the barrier material piece 33c inserted into the frame 129b, the damping sole part 121b on the top side of the reinforcement device part 119c, and the outsole part 117b on the bottom of the reinforcement device part 119c. To this extent, the two embodiments of FIGS. 22 and 26 correspond.

Figure 23:
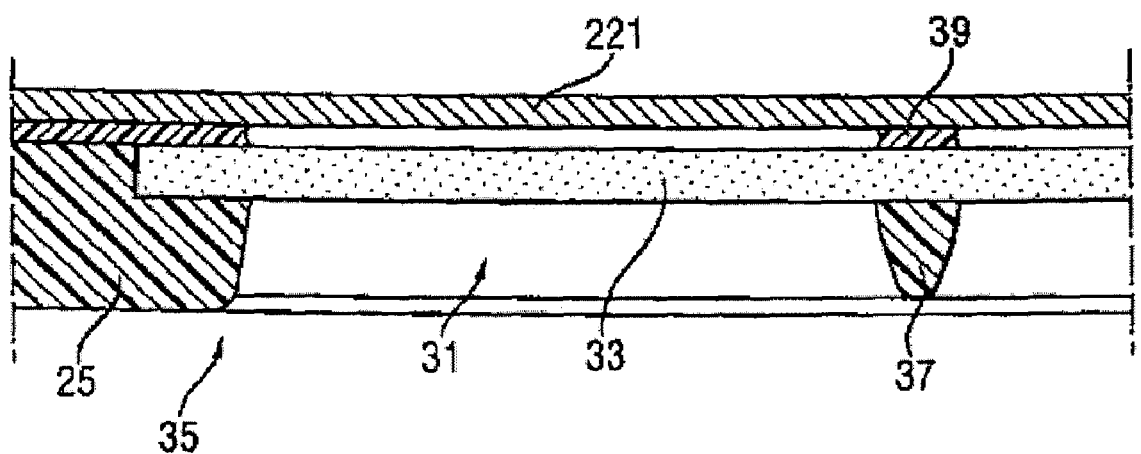

FIG. 23 shows an example of a barrier unit 35 in which a piece of shoe-reinforcement material 33 is provided on the bottom with at least one reinforcement bar 37. On the surface area of the shoe-reinforcement material 33 opposite the reinforcement bar 37, an adhesive 39 is applied, by means of which the shoe-reinforcement material 33 is joined to the waterproof, water-vapor-permeable shaft bottom 221, which is situated above the barrier unit 35 outside the composite shoe sole. The glue 39 is applied in such a way that the shaft bottom 221 is joined to the shoe-reinforcement material 33 wherever no material of the reinforcement bar 37 is situated on the bottom of the shoe-reinforcement material 33. In this way, it is ensured that the water-vapor-permeability function of the shaft bottom 115 is only interfered with by glue 39 where the shoe-reinforcement material 33 cannot permit any water-vapor transport anyway, because of the arrangement of the reinforcement bar 37.

Whereas the corresponding composite shoe sole 105 in FIGS. 22 and 26 is still separated from the corresponding shaft 103, FIGS. 24, 25, and 27 show these two embodiments with the composite shoe sole 105 applied to the shaft bottom, in an enlarged view and as a cutout. In these enlarged views, the shaft-bottom functional layer 247 of the shaft-bottom functional-layer laminate 237, in all embodiments, is preferably a microporous functional layer, for example, made of expanded polytetrafluoroethylene (ePTFE). As already mentioned above, however, various types of functional layer materials can also be used.

In these enlarged cutout views of FIGS. 24, 25, and 27, the waterproof connection between the overlapping opposite ends of the shaft functional layer 215 and the shaft-bottom functional layer 247 created with the sealing material 248 can be seen particularly well. In addition, the inclusion of a mesh-band longitudinal side in the Strobel seam 235 can also be seen more clearly in FIGS. 25 and 27 than in FIGS. 22 and 26.

FIG. 24 shows an embodiment, in which the composite sole 105 according to the invention is attached to the shaft bottom by means of attaching glue 250. The shaft functional-layer laminate 216 is a three-ply composite with a textile layer 214, a shaft functional layer 215, and a lining layer 213. The end 238 of the outer material layer 211 on the sole side is attached with lasting glue 249 to the shaft functional-layer laminate 216.

The attaching glue 250 is applied superficially to the surface of the composite sole, except for the through holes 135 and the shoe-reinforcement material 33 arranged in the area of the through holes 135. During attachment of the composite sole to shaft bottom 221, the attaching glue 250 penetrates up to and partially into the shaft functional-layer laminate 216 and up to and partially into the edge areas of the shaft-bottom functional-layer laminate 237.

FIG. 25 is a view of the shaft structure according to FIG. 22 with a molded-on composite shoe sole. The three-ply shaft-bottom functional layer laminate 237 is then attached to the shaft-mounting sole 233, so that the textile backing 246 faces the composite sole. This is advantageous, because the sole molding material 260 penetrates more easily into the thin textile backing and can be anchored there and a firm connection to the shaft bottom functional layer 237 is created.

The barrier unit with the at least one opening 135 in the at least one piece of barrier material 33 is present as a prefabricated unit and is inserted into the injection mold before the molding process. The sole-molding material 260 is molded onto the shaft bottom accordingly, advancing up to the shaft functional-layer laminate 216 through the mesh band 241.

FIG. 27 shows an enlarged and sectional view of FIG. 26. The sole composite 105 shows an additional embodiment of the barrier unit according to the invention. The shaft-reinforcement device 119c forms a part of the composite sole 105 and does not extend here to the outer periphery of the composite sole 105. A piece of shoe-reinforcement material 33c is applied over the opening 135, so that the material 33c lies on the peripheral continuous flat limitation edge 130 of opening 135. The composite sole 105 can be attached to the shaft bottom 221 with attaching glue 250 or molded on with sole-molding material 260.

FIG. 27 also clearly shows that in the embodiment in which the shaft-bottom functional-layer laminate 237 assumes the function of a shaft-mounting sole 233, the laminate comes to lie directly above the opposite top of the shoe-reinforcement material piece 33c, which is particularly advantageous. In this case, an air cushion cannot form between the shaft bottom functional-layer laminate 237 and the barrier shoe-reinforcement piece 33c, which might adversely affect water-vapor removal, and the shoe-reinforcement material piece 33c, especially the shaft-bottom functional layer 237, are situated particularly tight against the foot sole of the user of such a shoe, which improves water-vapor removal, which is also determined by the temperature gradient existing between the shoe interior and the shoe exterior.

To produce the footwear according to the invention, the composite shoe sole 105 and the shaft 103 are prepared, whereby which the lower area of the shaft on the sole side can still remain open. The shaft 103 is then provided on its shaft end area 219 on the sole side with a shaft bottom 221, which is formed either by the shaft-bottom functional-layer laminate 237 or by such a shaft-bottom functional-layer laminate 237 and a separate shaft-mounting sole 233. As an alternative, a shaft can be prepared that is provided from the outset on its shaft-end area 219 on the sole side with a shaft-bottom functional layer laminate 237. The composite shoe sole 105 is then attached to the shaft end 219 on the sole side, which can occur either by gluing of the composite shoe sole 105 to the lower shaft end by means of an adhesive 250, or by the fact that a composite shoe sole 105 is molded onto the bottom of the shaft. The connection between the lower shaft end and the composite shoe sole 105 occurs in such a way that the shaft-bottom functional layer 239 remains unconnected to the shoe-reinforcement material 33 of the shaft-bottom composite 221 at least in the area of the through holes of the composite shoe sole 105. Because of this, the capability of the shaft-bottom functional layer 239 with respect to water-vapor permeability is fully retained in the area of the through holes 31, without being adversely affected by glue spots or other obstacles for the transport of water vapor.

FIG. 28 is a view of another embodiment of the composite sole according to the invention. The perspective view shows several openings 135 in the shoe-reinforcement device 119 that are arranged from the toe area to the heel area of the composite sole. The reinforcement material 33 is therefore also present in the heel area. The outsole is formed by the outsole parts 117.

FIG. 29 is a view of another embodiment of the composite sole according to the invention in a cross-sectional view. The composite sole 105 of this embodiment is quite similar to the composite sole depicted in FIG. 26. The composite sole 105 according to FIG. 29 has an outsole, whereby a cross-section through the ball of the foot area of the composite sole 105 and thereby a cross-section through the corresponding outsole part 117b is shown in this diagram. However, the disclosure according to FIG. 29 also applies to the other areas of the composite sole 105, i.e., to its midfoot part and heel part. The outsole part 117b has a tread 153 that touches the floor during walking. The sectional view of the composite sole 105 of FIG. 27 shows the reinforcement-device part 119c with its opening 135c, its upward protruding limitation edge 129b, the shoe-reinforcement material piece 33c inserted into the limitation edge 129b, the damping sole part 121b on the upper side of the reinforcement-device part 119c, and the outsole part 117b on the bottom of the reinforcement part 119c. A support element 151 is applied to the bottom of the shoe-reinforcement material piece 133c. This extends from the side of the shoe-reinforcement material 33 facing the tread to the level of tread 153, so that the shoe-reinforcement material 33 during walking is supported on the floor by the support element 151. This means that a lower free end of the support element 151 in FIG. 29 touches this surface when the shoe provided with this composite sole stands on a surface. Through this support by support element 151, during walking on such a surface, the shoe-reinforcement material piece 33c is held essentially in the position depicted in FIG. 29, so that it is prevented from bending under the load of the user of the shoe. Several support elements 151 can be arranged in opening 135c, in order to increase the support effect for the shoe-reinforcement material piece 33c and make its surface area more uniform.

The support function can also be obtained by the fact that the reinforcement bar 137 depicted in FIG. 26 is simultaneously formed as support element 151 by allowing the reinforcement bar 137c not to end at a spacing from the bottom of the outsole part 117b, which serves as a tread, but extending it to the level of this bottom. The reinforcement bar 137c is then given the dual function of reinforcement and support of the shoe-reinforcement material piece 33c. For example, the reinforcement bars 33c depicted in FIG. 10 or the reinforcement mesh 37d depicted in FIG. 11 can be formed fully or partially as support elements 151.

With the sole structure according to the invention, high water-vapor-permeability is achieved, because, on the one hand, large-surface through holes in the composite shoe sole 105 are provided and these are closed with material of high water-vapor permeability, and because, at least in the area of the through holes 31, there are no connections between the water-vapor-permeable shoe-reinforcement material 33 and the shaft-bottom functional layer 247 that prevent water-vapor exchange, and such a connection is at most present in the areas outside the through holes 31 of the composite shoe sole 105 that do not actively participate in water-vapor exchange, such as the edge areas of the composite shoe sole 105. In the structure according to the invention, the shaft-bottom functional layer 247 is also tightly arranged in the foot, which leads to accelerated water-vapor removal.

The shaft-bottom functional layer laminate 237 can be a multilayer laminate with two, three, or more layers. At least one functional layer is contained with at least one textile support for the functional layer, whereby the functional layer can be formed by a waterproof, water-vapor-permeable membrane 247, which is preferably microporous.

Test Methods

Thickness

The thickness of the barrier material according to the invention is tested according to DIN ISO 5084 (October 1996).

Puncture Resistance

The puncture resistance of the textile fabric can be measured with a measurement method employed by the EMPA ([Swiss] Federal Material Testing and Research Institute), using a test device of the Instrom tensile testing machine (model 4465). A round textile piece 13 cm in diameter is punched out with a punch and attached to a support plate in which there are 17 holes. A punch, on which 17 spike-like needles (sewing needle type 110/18) is attached and lowered at a speed of 1000 mm/min far enough that the needles pass through the textile piece into the holes of the support plate. The force for puncturing of the textile piece is measured by means of a measurement sensor (a force sensor). The result is determined from a test of three samples.

Waterproof Functional Layer/Barrier Unit

A functional layer is considered "waterproof," optionally including the seams provided on the functional layer, when it guarantees a water penetration pressure of at least $1 \times 10^4$ Pa. The functional-layer material preferably guarantees a water-penetration pressure of more than $1 \times 10^5$ Pa. The water-penetration pressure is then measured according to a test method in which distilled water, at 20±2° C., is applied to a sample of 100 cm² of the functional layer with increasing pressure. The pressure increase of the water is 60±3 cm H₂O per minute. The water-penetration pressure corresponds to the pressure at which water first appears on the other side of the sample. Details concerning the procedure are provided in ISO standard 0811 from the year 1981.

Waterproof Shoe

Whether a shoe is waterproof can be tested, for example, with a centrifugal arrangement of the type described in U.S. Pat. No. 5,329,807.

Water-Vapor Permeability of the Barrier Material

The water-vapor permeability values of the barrier material according to the invention are tested by means of the so-called beaker method according to DIN EN ISO 15496 (09/2004).

Water-Vapor Permeability of the Functional Layer

A functional layer is considered "water-vapor-permeable", if it has a water-vapor permeability number, Ret, of less than 150 $m^1 \times Pa \times W^{-1}$. The water-vapor permeability is tested according to the Hohenstein skin model. This test method is described in DIN EN 31092 (02/94) or ISO 11092 (1993).

Water-Vapor Permeability of the Shoe-Bottom Structure According to the Invention In a embodiment of the footwear according to the invention with a shoe-bottom structure that includes the composite shoe sole and the shaft-bottom functional layer or the shaft-bottom functional layer laminate situated above it, the shoe-bottom structure has a water-vapor permeability (MVTR—moisture vapor transmission rate) in the range from 0.4 g/h to 3 g/h, which can lie in the range from 0.8 g/h to 1.5 g/h and in a practical embodiment is 1 g/h.

The gauge of water-vapor permeability of the shoe-bottom structure can be determined with the measurement method documented in EP 0,396,716 B1, which is conceived for measuring the water-vapor permeability of an entire shoe. To measure the water-vapor permeability of only the shoe-bottom structure of a shoe, the measurement method according to EP 0,396,716 B1 can also be used, in which the measurement is made with the measurement layout depicted in FIG. 1 of EP 0,396,716 B1 in two consecutive measurement scenarios, namely once for the shoe with a water-vapor-permeable shoe-bottom structure and another time for an otherwise identical shoe with a water-vapor-impermeable shoe-bottom structure. From the difference between the two measurements, the percentage of water-vapor permeability can be determined that is attributed to the water-vapor permeability of the water-vapor-permeable shoe-bottom structure.

In each measurement scenario, using the measurement method according to EP 0,396,716 B1, the following sequence of steps is used:

a) Conditioning the shoe by leaving it in an air-conditioned room (23° C., 50% relative humidity) for at least 12 hours.

b) Removing the insert sole (foot bed)

c) Lining the shoe with a waterproof, water-vapor-permeable lining material adapted to the shoe interior, which, in the area of the foot-insertion opening of the shoe, can be sealed waterproof and water-vapor-tight with a waterproof, water-vapor-impermeable sealing plug (for example, made of Plexiglas with an inflatable sleeve).

d) Filling water into the lining material and closure of the foot insertion opening of the shoe with the sealing plug.

e) Preconditioning the water-filled shoe by leaving it for a predetermined period (3 hours), whereby the temperature of the water is kept constant at 35° C. The climate of the surrounding room is also kept constant at 23° C. and 50% relative humidity. The shoe is blown against frontally by a fan during the test with a wind velocity, on average, of at least 2 m/s to 3 m/s (to destroy a resting air layer that forms around the standing shoe, which would cause a significant resistance to water-vapor passage).

f) Reweighing the shoe filled with water and sealed with the sealing plug after preconditioning (result: weight m2 (g))

g) Standing again in a 3-hour phase under the same conditions as in step e)

h) Reweighing the sealed water-filled shoe (result: weight m3 (g)) after the 3-hour test phase i) Determining the water-vapor permeability of the shoe from the amount of water vapor that escapes through the shoe during the 3-hour test period 3 hours (m2−m3) (g) according to the relation M=(m2−m3) (g)/3(h).

After both measurement scenarios have been conducted, whereby the water-vapor permeability values are measured, on the one hand, for the entire shoe with a water-vapor-permeable shoe-bottom structure (value A) and, on the other hand, for the entire shoe with a water vapor-permeable shaft-bottom structure (value B), the water-vapor permeability value for the water vapor-permeable shoe-bottom structure alone can be determined from the difference A-B.

It is important during measurement of the water-vapor permeability of the shoe with the water-vapor-permeable shoe-bottom structure to avoid a situation, where the shoe or its sole stands directly on a closed substrate. This can be achieved by raising the shoe or by positioning the shoe on a mesh structure, so that it is ensured that the ventilation air stream can flow along—or better beneath—the outsole.

It is useful in each test layout for a certain shoe to make repeated measurements and consider the averages from them, in order to be able to estimate the measurement scatter better. At least two measurements should be made for each shoe with the measurement layout. In all measurements, a natural fluctuation of the measurement results of ±0.2 g/h around the actual value, for example, 1 g/h, should be assumed. For this example, measured values between 0.8 g/h and 1.2 g/h could therefore be determined for the identical shoe. Influencing factors for these fluctuations could be the person performing the test or the quality of sealing on the upper shaft edge. By determining several individual measured values for the same shoe, a more exact picture of the actual value can be obtained.

All values for water-vapor permeability of the shoe-bottom structure are based on a normally cut men's shoe of size 43 (French sizes), whereby the statement of the size is not standardized, and shoes of different manufacturers could come out differently.

There are essentially two possibilities for the measurement scenarios:
1. Measuring shoes with a water vapor-permeable shaft having
   1.1 a water-vapor-permeable shoe-bottom structure;
   1.2 a water-vapor-impermeable shoe-bottom structure;
2. Measuring shoes with a water-vapor-impermeable shaft having
   2.1 a water-vapor-permeable shoe-bottom structure,
   2.2 a water-vapor-impermeable shoe-bottom structure.

Elongation and Tensile Strength

An elongation and tensile-strength test was conducted according to DIN EN ISO 13934-1 of 04/1999. Instead of five samples per direction, three were used. The spacing of the clamping jaws was 100 mm in all samples.

Abrasion

With respect to abrasion resistance, for the abrasion measurements, two measurement methods were used to obtain the abrasion values in the comparison table. In the first place, a Martindale abrasion tester was used (abrasion carbon in the table), whereby, according to Standard DIN EN ISO 124940-1; -2 (04/1999), the sample being tested is rubbed against sandpaper. Three deviations from the standard are then made: firstly, sandpaper with grain 180 plus standard foam is tightened in the sample holder. Secondly, standard felt from the test sample is tightened in the sample table. Thirdly place, the sample is inspected very 700 passes and the sandpaper is changed. On the other hand, abrasion resistance was tested in wet samples (in the table "wet abrasion") according to DIN EN ISO 12947-1, -2, -4, with the deviation from the standard that the sample table with standard felt and standard wool were saturated with distilled water every 12,800 passes.

In the abrasion tests, friction movements according to Lissajous figures were conducted. Lissajous figures represent periodically repeating overall pictures with appropriate choice of the ratio of participating frequencies, which consist of individual figures offset relative to each other. Passage through one of these individual figures is referred to as a pass in conjunction with the abrasion test. In all materials 1 to 5, the number of passes the first holes occurred in the corresponding material and the material was therefore scraped through was measured. In the comparison table, two pass values are found for each of the materials formed from two abrasion tests with the same material.

Hardness

Hardness test according to Shore A and Shore D (DIN 53505, ISO 7819-1, DIN EN ISO 868)

Principle:

"Shore hardness" is understood to mean the resistance to penetration of an object of a specific shape and defined spring force. The Shore hardness is the difference between the numerical value 100 and the penetration depth of the penetration object in mm under the influence of the test force divided by the scale value 0.025 mm.

During testing according to Shore A, a truncated cone with an opening angle of 35° is used as penetration object and in Shore D, a cone with an opening angle of 30° and a tip radius of 0.1 mm is used. The penetration objects consist of polished, tempered steel.

Measurement Equation:

$$HS = 100 - \frac{h}{0.025}$$

$$F = 550 + 75 \; HSA$$

$$F = 445 \; HSD$$

H in mm, F in mN

Area of Application:

Because of the different resolution of the two Shore-hardness methods in different hardness ranges, the materials with a Shore A hardness >80 are appropriately tested according to Shore D and materials with a Shore D hardness <30 according to Shore A.

| Hardness scale | Application |
| --- | --- |
| Shore A | Soft rubber, very soft plastic |
| Shore D | Hard rubber, soft thermoplastic |

DEFINITIONS

Barrier Material:

A material that enables the shoe or parts/materials present in the shoe, such as outer material, sole, membrane, to be mechanically protected and resist deformation, and also penetration of external objects/foreign bodies, for example, through the sole, while retaining high water-vapor transport, i.e., high climate comfort in the shoe. The mechanical protection and resistance to deformation are mostly based on limited elongation of the barrier material.

Fiber Composite:

General term for a composite of fibers of any type. This includes leather, non-woven materials or knits consisting of metal fibers, under some circumstances, also in a blend with textile fibers, also yarns and textiles produced from yarns (fabrics).

The fiber composite must have at least two fiber components. These components can be fibers (for example, staple fibers), filaments, fiber elements, yarns, strands, etc. Each fiber component consists either of a material or contains at least two different material fractions, the one fiber part softening/melting at a lower temperature than the other fiber part (bico). Such bico fibers can have a core-shell structure—a core fiber part is enclosed with a shell fiber part here—a side-to-side structure or an island-in-the-sea structure. Such processing and machines are available from Rieter Ingolstadt, Germany and/or Schalfhorst in Mönchengladbach, Germany.

The fibers can be simply spun, multifilaments, or several torn fibers with frayed ends looped to one another.

The fiber components can be uniformly or non-uniformly distributed in the fabric composite. The entire fabric composite must preferably be temperature-stable, but at least up to 180° C. A uniform and smooth surface on at least one side of the fiber composite is achieved by means of pressure and temperature. This smooth surface points "downward" to the ground/floor, so that a situation is achieved, in which particles/foreign objects bounce off the smooth surface better or are repelled more simply.

The properties of the surface or overall structure of the fiber composite or reinforcement material depend on the selected fibers, the temperature, the pressure, and the period over which the fiber composite was exposed to temperature and pressure.

Non-Woven Material:

Here, the fibers are laid on a conveyor belt and tangled.

Lay:

A fishnet or sieve structure of fibers. See EP 1,294,656 from Dupont.

Felt:

Wool fibers that are opened and hooked by mechanical effects.

Woven Fabric:

A fabric produced with warp and weft threads.

Woven and Knit Fabric:

A fabric formed by meshes.

Melting Point:

The melting point is the temperature at which the fiber component or fiber part becomes liquid. "Melting point" is understood, in the field of polymer or fiber structures, to mean a narrow temperature range in which the crystalline areas of the polymer or fiber structure melt and the polymer converts to the liquid state. It lies above the softening temperature range and is a significant quantity for partially crystallized polymers. "Molten" means the change of state of aggregation of a fiber or parts of a fiber at a characteristic temperature from solid to viscous/free-flowing.

Softening Temperature Range:

The second fiber component of the second fiber part must only become soft/plastic, but not liquid. This means that the softening temperature used lies below the melting point, at which the components/fractions flow. The fiber component or parts of it are preferably softened, so that the more temperature-stable component is embedded or incorporated in the softened parts. The first softening temperature range of the first fiber component lies higher than the second softening temperature range of the second fiber component or the second fiber part of the second fiber component. The lower limit of the first softening range can lie below the upper limit of the second softening temperature range.

Adhesive Softening Temperature:

The temperature, at which softening of the second fiber component or the second fiber part occurs, in which its material exerts a gluing effect, so that at least some of the fibers of the second fiber component are thermally bonded to one another by gluing, a bonding reinforcement of the fiber component occurs, which lies above the bonding obtained in a fiber composite with the same materials for the two fiber components by purely mechanical bonding, for example, by needle bonding of the fiber composite. The adhesive softening temperature can also be chosen in such a way that softening of the fibers of the second fiber component occurs to an extent that gluing develops, not only of fibers of the second fiber component to one another, but also partial or full enclosure of the individual sites of the fibers of the first fiber composite with softened material of the fibers of the second fiber composite, i.e., partial or full embedding of those sites of the fibers in the first fiber composite in the material of the fibers of the second fiber component, so that a correspondingly increased reinforcement bonding of the fiber composite is produced.

Temperature Stability:

If the reinforcement device is molded on, the barrier material must be temperature-stable for molding. The same applies to molding (about 170° C.-180° C.) or vulcanization of the shoe sole. If the reinforcement device is to molded on, the barrier material must have a structure such that the reinforcement device can at least penetrate into the structure of the barrier material, or optionally penetrate through it.

Functional Layer/Membrane:

The shaft-bottom functional layer, and optionally the shaft functional layer, can be formed by a waterproof, water-vapor-permeable coating or a waterproof, water-vapor-permeable membrane, which can either be a microporous membrane or a membrane having no pores. In one embodiment of the invention, the membrane is expanded polytetrafluoroethylene (ePTFE).

Appropriate materials for a waterproof, water-vapor-permeable functional layer include polyurethane, polypropylene, polyester, including polyether-ester and laminates thereof, as described in documents U.S. Pat. No. 4,725,418 and U.S. Pat. No. 4,493,870. However, microporous expanded polytetrafluoroethylene (ePTFE) is particularly preferred, as described, for example, in documents U.S. Pat. No. 3,953,366 and U.S. Pat. No. 4,187,390, and expanded polytetrafluoroethylene provided with hydrophilic impregnation agents and/or hydrophilic layers; see, for example, document U.S. Pat. No. 4,194,041. A "microporous functional layer" is understood to mean a functional layer, whose average pore size is between about 0.2 µm and about 0.3 µm.

The pore size can be measured with a Coulter Porometer (trade name) produced by Coulter Electronics, Inc., Hialeah, Fla., USA.

Barrier Unit:

The barrier unit is formed by the barrier material, and optionally by the reinforcement device in the form of at least one bar and/or a frame. The barrier unit can be present in the form of a prefabricated component.

Composite Shoe Sole:

The composite shoe sole consists of barrier material and at least one reinforcement device and at least one outsole, as well as optional additional sole layers, whereby the barrier material closes at least a through hole extending through the thickness of the composite shoe sole.

Through Hole:

A through hole is an area of the composite shoe sole through which water-vapor transport is possible. The outsole and the reinforcement device each have passage openings that overall form a through hole through the entire thickness of the composite shoe sole. The through hole is therefore formed by the intersection surface of the two passage openings. Any bars present are arranged within the peripheral edge of the corresponding through hole and do not form a limitation of the through hole. The area of the through hole is determined by subtracting the area of all bridging bars, since these bar surfaces block water-vapor transport and therefore do not represent a through hole area.

Reinforcement Device:

The reinforcement device acts as an additional reinforcement of the barrier material and is formed and applied to the barrier material, so that the water-vapor permeability of the barrier material is only slightly influenced, if at all. This is achieved by the fact that only a small area of the barrier material is covered by the reinforcement device. The reinforcement device is preferably directed downward toward the floor. The reinforcement device is primarily assigned not a protective function, but a reinforcement function.

Opening of the Reinforcement Device:

The at least one opening of the reinforcement device is bounded by its at least one frame. The area of an opening is determined by subtracting the area of all bridging bars.

Shoe:

A foot covering, consisting of a composite shoe sole and a closed upper (shaft).

Shoe Bottom:

The shoe bottom includes all layers beneath the foot.

Thermal Activation:

Thermal activation occurs by exposing the fiber composite to energy, which leads to an increase in temperature of the material to the softening temperature range.

Water-Permeable Composite Shoe Sole:

A composite shoe sole is tested according to the centrifuge arrangement of the type described in U.S. Pat. No. 5,329,807. Before testing, it must be ensured that any shaft-bottom functional layer present is made water-permeable. A water-permeable composite shoe sole is assumed, if this test is not passed. If necessary, the test is conducted with a colored liquid, in order to show the path of electricity through the composite shoe sole.

Laminate:

A laminate is a composite consisting of a waterproof, water-vapor-permeable functional layer with at least one textile layer. The at least one textile layer, also called a backing, primarily serves to protect the functional layer during processing. We speak here of a two-ply laminate. A three-ply laminate consists of a waterproof, water-vapor-permeable functional layer embedded between two textile layers, spot-gluing being applied between these layers.

Waterproof Functional Layer/Barrier Unit:

A functional layer is considered "waterproof," optionally including seams provided on the functional layer, if it guarantees a water penetration pressure of at least $1 \times 10^4$ Pa.

Top of the Composite Shoe Sole:

The "top" of the composite shoe sole is understood to mean the surface of the composite shoe sole that lies opposite the shaft bottom.

Outsole:

"Outsole" is understood to mean the part of the composite shoe sole that touches the floor/ground or produces the main contact with the floor/ground.

List of reference numbers

1 Fiber composite
2 First fiber component
3 Second fiber component
4 Core
5 Shell
6 Connection
21 Composite shoe sole
23 Outsole
25 Shoe-reinforcement device
27 Opening outsole
29 Opening of shoe-reinforcement device
31 Through hole
33 Shoe-reinforcement material
    33a Shoe-reinforcement material
    33b Shoe-reinforcement material
    33c Shoe-reinforcement material
    33d Shoe-reinforcement material
35 Barrier unit
37 Reinforcement bar
    37a Individual bar
    37b Individual bar
    37c Individual bar
    37d Reinforcement mesh
39 Glue
43 Circular surface
101 Shoe
103 Shaft
105 Composite shoe sole
107 Forefoot area
109 Midfoot area
111 Heel area
113 Foot-insertion opening -continued List of reference numbers 115 Shaft bottom
117 Multipart outsole
    117a Heel area of multipart outsole
    117b Ball-of-foot area of multipart outsole
    117c Toe area of multipart outsole
119 Reinforcement device
    119a Heel area
    119b Midfoot area
    119c Forefoot area
121 Damping sole part
    121a Heel area of damping sole part
    121b Midfoot area of damping sole part
[123] Outsole openings
    123a Heel area
    123b Midfoot area
    123c Forefoot area
125 Passage opening in the heel area 119a of the reinforcement device
[127] Openings of damping sole part
    127a Heel area
    127b Midfoot area
    127c Forefoot area
[129] Limitation edge of the shoe-reinforcement device
    129a Midfoot area
    129b Forefoot area
    129c Forefoot area
131 Protrusions
133 Recesses
[135] Openings of reinforcement device
    135a Midfoot area
    135b Forefoot area
    135c Forefoot area
    135d Forefoot area
[137] Reinforcement mesh
    137a Midfoot area
    137b Forefoot area
    137c Forefoot area
    137d Forefoot area
139 Connection element
141 Side wings
143 Wing parts of reinforcement device
145 Reinforcement rib
147 Fraying of the reinforcement device
150 Support protrusion
151 Support element
153 Tread
211 Outer material layer
213 Lining layer
214 Textile layer
215 Shaft functional layer
216 Shaft functional-layer laminate
217 Upper shaft end
219 Shaft end area on the sole side
221 Shaft bottom
233 Shaft mounting sole
235 Strobel seam
237 Shaft-bottom functional-layer laminate
238 End of the outer material layer on the sole side
239 End of the shaft functional layer on the sole side
241 Seam band
243 First seam
244 Textile layer
245 Peripheral layer
246 Textile backing
247 Membrane
248 Sealing material
249 Lasting glue
250 Attaching glue
260 Sole-molding material

COMPARATIVE TABLE

| | Material type | | | | |
|---|---|---|---|---|---|
| | Split sole leather | Non-woven material, needle-bonded only | Woven material, needle-bonded only | Non-woven material, needle-bonded and thermally bonded | Non-woven material, needle-bonded, thermally bonded; thermal surface compression with 3.3 N/cm$^2$/230° C./10 s |
| Material number | Material 1 | Material 2 | Material 3 | Material 4 | Material 5 |
| Material | 100% leather | 100% PES | 100% PES | PES + bico PES total 100% PES | PES + bico PES total 100% PES |
| Basis weight (g/m$^2$) | 2383 | 206 | 125 | 398 | 397 |
| Thickness (mm) | 3.36 | 2.96 | 2.35 | 1.71 | 1.46 |
| MVTR (g/m$^2$ 24 h) (1) | 3323 | 8086 | 9568 | 9459 | 9881 |
| Longitudinal elongation at 50 N (%) | 1 | 34 | 55 | 0 | 0 |
| Longitudinal elongation at 100 N (%) | 2 | 48 | 79 | 1 | 0 |
| Longitudinal elongation at 150 N (%) | 2 | 59 | 104 | 1 | 0 |
| Longitudinal tensile force (N) | 3106 | 324 | 152 | 641 | 821 |
| Longitudinal tensile elongation (%) | 40 | 94 | 107 | 26 | 27 |
| Transverse elongation of 50 N (%) | 0 | 32 | 46 | 0 | 0 |
| Transverse elongation of 100 N (%) | 1 | 43 | 63 | 1 | 0 |
| Transverse elongation of 150 N (%) | 1 | 52 | 75 | 1 | 0 |
| Transverse tensile force (N) | 4841 | 410 | 252 | 884 | 742 |
| Transverse tensile elongation (%) | 43 | 92 | 99 | 35 | 32 |
| Puncture resistance (N) | 857 | 5 | 6 | 317 | 291 |
| Wet abrasion (passes) (2) | 25,600/30,100 | 20,600/20,600 | 20,700/16,500 | 70,200/70,200 | 614,000/704,000 |
| Carbon abrasion (passes) (2) | about 35,000 | 1,570/1,600 | 452/452 | 7,700/7,700 | 14,000/15,400 |

(1) DIN EN ISO 15496 (September 2004)
(2) DIN EN ISO 12947-1; -2 (April 1999)

| Men's shoe size 42/43 (French) | | | | | | | | |
|---|---|---|---|---|---|---|---|---|
| Shoe number | Repetition measurements | Sole water-vapor-permeable? YES/NO | Air stream over the shaft and under the sole | Weight m2 (g) before beginning of test | Weight m3 (g) after the end of the test | Total shoe water-vapor permeability MVTR = (m2 − m3)/test time (g/h) | Average value of repetition measurements per shoe number MVTR (g/h) | Water-vapor permeability of the shoe-bottom structure (g/h) |
| 1 | 1 | No | Yes | 1106.66 | 1097.55 | 3.0 | 3.1 | 0 |
| 1 | 2 | No | Yes | 1103.58 | 1095.03 | 2.8 | | |
| 1 | 3 | No | Yes | 1102.98 | 1094.63 | 2.8 | | |
| 1 | 4 | No | Yes | 1112.44 | 1102.54 | 3.3 | | |
| 1 | 5 | No | Yes | 1143.9 | 1133.75 | 3.4 | | |
| 1 | 6 | No | Yes | 1108.58 | 1098.42 | 3.4 | | |
| 1 | 7 | No | Yes | 1102.62 | 1094.15 | 2.8 | | |
| 1 | 8 | No | Yes | 1101.78 | 1093.16 | 2.9 | | |
| 1 | 9 | No | Yes | 1117.55 | 1107.86 | 3.2 | | |
| 2 | 1 | Yes | Yes | 1179.2 | 1167.06 | 4.0 | 4.0 | 4.0 − 3.1 = 0.9 |
| 2 | 2 | Yes | Yes | 1156.7 | 1144.85 | 4.0 | | |
| 2 | 3 | Yes | Yes | 1144.65 | 1132.97 | 3.9 | | |
| 2 | 4 | Yes | Yes | 1159.46 | 1148.3 | 3.7 | | |
| 2 | 5 | Yes | Yes | 1153.56 | 1142.5 | 3.7 | | |
| 2 | 6 | Yes | Yes | 1175.88 | 1163.36 | 4.2 | | |

-continued

Men's shoe size 42/43 (French)

| Shoe number | Repetition measurements | Sole water-vapor-permeable? YES/NO | Air stream over the shaft and under the sole | Weight m2 (g) before beginning of test | Weight m3 (g) after the end of the test | Total shoe water-vapor permeability MVTR = (m2 − m3)/ test time (g/h) | Average value of repetition measurements per shoe number MVTR (g/h) | Water-vapor permeability of the shoe-bottom structure (g/h) |
|---|---|---|---|---|---|---|---|---|
| 2 | 7 | Yes | Yes | 1173.78 | 1160.84 | 4.3 | | |
| 2 | 8 | Yes | Yes | 1165.54 | 1153.05 | 4.2 | | |
| 3 | 1 | Yes | Yes | 1153 | 1140 | 4.3 | 4.3 | 4.3 − 3.1 = 0.9 |
| 3 | 2 | Yes | Yes | 1168.42 | 1156.17 | 4.1 | | |
| 3 | 3 | Yes | Yes | 1160.6 | 1146.98 | 4.5 | | |
| 3 | 4 | Yes | Yes | 1183.8 | 1170.5 | 4.4 | | |

Test time: 3 hours
All shafts constructed identically, i.e., scatter only through natural scatter of the materials (leather, textile, etc.)
Shaft can be designed to be waterproof
Constant water amount in all shoes
Insert soles removed for the test
Shoe-bottom structure in numbers 2 and 3 comparable: In no. 1, only the outsole is closed, i.e., it has no openings

The invention claimed is:

1. A water-vapor-permeable composite shoe sole designed for footwear, with at least one through hole extending through the thickness of the composite shoe sole, which is closed by a shoe-reinforcement material that has a fiber composite with a first fiber component and a second fiber component, having two fiber parts, whereby the first fiber component has a first melting point and a first softening-temperature range lying below the first melting point and a second fiber part of the second fiber component has a second melting point and a second softening-temperature range lying below the second melting point;
the first melting point and the first softening-temperature range are higher than the second melting point and the second softening-temperature range;
the first fiber part of the second fiber component has a higher melting point and a higher softening temperature range lying beneath the first fiber part's melting point than the second fiber part;
and the fiber composite is thermally bonded, while retaining water-vapor permeability in the thermally bonded area, as a result of thermal activation of the second fiber part of the second fiber component with an adhesive softening temperature lying in the second softening-temperature range wherein a shaft is provided on a shaft-end area on a sole side with a waterproof and water-vapor-permeable shaft-bottom functional layer, whereby the composite shoe sole is connected to the shaft-end area provided with the shaft-bottom functional layer, so that the shaft-bottom functional layer is not connected to the shoe-reinforcement material, at least in the area of the at least one through hole.

2. A composite shoe sole according to claim 1, in which at least one reinforcement device engages the shoe-reinforcement material.

3. A composite shoe sole according to claim 2, of which at least one reinforcement device is designed in such a way that at least 15% of the area of the forefoot area of the composite shoe sole is water-vapor-permeable.

4. A composite shoe sole according to claim 3, of which at least one reinforcement device is designed in such a way that at least 25% of the area of the forefoot area of the composite shoe sole is water-vapor-permeable.

5. A composite shoe sole according to claim 4, of which at least one reinforcement device is designed in such a way that at least 40% of the area of the forefoot area of the composite shoe sole is water-vapor-permeable.

6. A composite shoe sole according to claim 5, of which at least one reinforcement device is designed in such a way that at least 50% of the area of the forefoot area of the composite shoe sole is water-vapor-permeable.

7. A composite shoe sole according to claim 6, of which at least one reinforcement device is designed in such a way that at least 60% of the area of the forefoot area of the composite shoe sole is water-vapor-permeable.

8. A composite shoe sole according to claim 7, of which at least one reinforcement device is designed in such a way that at least 75% of the area of the forefoot area of the composite shoe sole is water-vapor-permeable.

9. A composite shoe sole according to claim 2, of which at least one reinforcement device is designed in such a way that at least 15% of the midfoot area of the composite shoe sole is water-vapor-permeable.

10. A composite shoe sole according to claim 9, of which at least one reinforcement device is designed in such a way that at least 25% of the midfoot area of the composite shoe sole is water-vapor-permeable.

11. A composite shoe sole according to claim 10, of which at least one reinforcement device is designed in such a way that at least 40% of the midfoot area of the composite shoe sole is water-vapor-permeable.

12. A composite shoe sole according to claim 11, of which at least one reinforcement device is designed in such a way that at least 50% of the midfoot area of the composite shoe sole is water-vapor-permeable.

13. A composite shoe sole according to claim 12, of which at least one reinforcement device is designed in such a way that at least 60% of the midfoot area of the composite shoe sole is water-vapor-permeable.

14. A composite shoe sole according to claim 13, of which at least one reinforcement device is designed in such a way that at least 75% of the midfoot area of the composite shoe sole is water-vapor-permeable.

15. A composite shoe sole according to claim 2, of which at least one reinforcement device is designed, so that at least 15% of the front half of the longitudinal extent of the composite shoe sole is water-vapor-permeable.

16. A composite shoe sole according to claim 15, of which at least one reinforcement device is designed in such a way that at least 25% of the front half of the longitudinal extent of the composite shoe sole is water-vapor-permeable.

17. A composite shoe sole according to claim 16, of which at least one reinforcement device is designed in such a way that at least 40% of the front half of the longitudinal extent of the composite shoe sole is water-vapor-permeable.

18. A composite shoe sole according to claim 17, of which at least one reinforcement device is designed in such a way that at least 50% of the front half of the longitudinal extent of the composite shoe sole is water-vapor-permeable.

19. A composite shoe sole according to claim 18, of which at least one reinforcement device is designed in such a way that at least 60% of the front half of the longitudinal extent of the composite shoe sole is water-vapor-permeable.

20. A composite shoe sole according to claim 19, of which at least one reinforcement device is designed in such a way that at least 75% of the front half of the longitudinal extent of the composite shoe sole is water-vapor-permeable.

21. A composite shoe sole according to claim 2, of which at least one reinforcement device is designed in such a way that at least 15% of the longitudinal extent of the composite shoe sole minus the heel area is water-vapor-permeable.

22. A composite shoe sole according to claim 21, of which at least one reinforcement device is designed in such a way that at least 25% of the longitudinal extent of the composite shoe sole minus the heel area is water-vapor-permeable.

23. A composite shoe sole according to claim 22, of which at least one reinforcement device is designed in such a way that at least 40% of the longitudinal extent of the composite shoe sole minus the heel area is water-vapor-permeable.

24. A composite shoe sole according to claim 23, of which at least one reinforcement device is designed in such a way that at least 50% of the longitudinal extent of the composite shoe sole minus the heel area is water-vapor-permeable.

25. A composite shoe sole according to claim 24, of which at least one reinforcement device is designed in such a way that at least 60% of the longitudinal extent of the composite shoe sole minus the heel area is water-vapor-permeable.

26. A composite shoe sole according to claim 25, of which at least one reinforcement device is designed in such a way that at least 75% of the longitudinal extent of the composite shoe sole minus the heel area is water-vapor-permeable.

27. A composite shoe sole according to claim 2, in which the reinforcement device has a number of reinforcement elements at the at least one through hole and a piece of the shoe-reinforcement material that closes the at least one through hole.

28. A composite shoe sole according to claim 2, with a number of through holes, each closed by a piece of the shoe-reinforcement material.

29. A composite shoe sole according to claim 2, with a number of through holes all of which are closed with one piece of the shoe-reinforcement material.

30. A composite shoe sole according to claim 2, in which the reinforcement device is designed in one piece and is attached relative the shoe-reinforcement material to close all through holes.

31. A composite shoe sole according to claim 2, in which the at least one through hole has an area of at least 1 $cm^2$.

32. A composite shoe sole according to claim 31, in which the at least one through hole has an area of at least 5 $cm^2$.

33. A composite shoe sole according to claim 32, in which the at least one through hole has an area of at least 20 $cm^2$.

34. A composite shoe sole according to claim 33, in which the at least one through hole has an area of at least 40 $cm^2$.

35. A composite shoe sole according to claim 2, of which the reinforcement device is designed as an outsole.

36. Footwear according to claim 1, in which the shaft is constructed with at least one shaft material, whereby the shaft material has at least a waterproof shaft functional layer in the area of the shaft-end area on the sole side, and whereby between the shaft functional layer and the shaft-bottom functional layer, a waterproof seal exists.

37. Footwear according to claim 1, in which the shaft-bottom functional layer is combined with a water-vapor-permeable shaft-mounting sole.

38. Footwear according to claim 1, in which the shaft-bottom functional layer is part of a multilayer laminate.

39. Footwear according to claim 1, in which the shaft-bottom functional layer is part of a multilayer laminate and forms a shaft-mounting sole.

40. Footwear according to claim 1, in which the shaft-bottom functional layer, and optionally the shaft functional layer, has a waterproof, water-vapor-permeable membrane.

41. Footwear according to claim 40, in which the membrane has expanded polytetrafluoroethylene.

42. Footwear according to claim 1, with a shoe-bottom structure that has the composite shoe sole and the shaft-bottom functional layer situated above the shoe sole, whereby the shoe-bottom structure has a water-vapor transmission rate (MVTR) in the range from 0.4 g/h to 3 g/h.

43. Footwear according to claim 42, of which the shoe-bottom structure has a water-vapor transmission rate (MVTR) in the range from 0.8 g/h to 1.5 g/h.

44. Footwear according to claim 43, of which the shoe-bottom structure has a water-vapor transmission rate (MVTR) of 1 g/h.

45. A composite shoe sole according to claim 1, with a tread in which the shoe-reinforcement material has at least one reinforcement bar on the side of the shoe-reinforcement material facing the tread.

46. A composite shoe sole according to claim 1, with a tread in which at least one support element is attached relative the shoe-reinforcement material in the at least one through hole that extend from the side of the shoe-reinforcement material facing the tread to the level of the walking surface, so that during walking the shoe-reinforcement material, is supported by the support element bracing itself against the walking surface.

47. A composite shoe sole according to claim 45, in which at least one of the reinforcement bars is simultaneously designed as a support element.

48. A method for producing footwear with a water-vapor-permeable composite shoe sole according to claim 1 with a shaft that is provided on a shaft-end area on the sole side with a waterproof and water-vapor-permeable shaft-bottom functional layer, with the following process steps:
 a) the composite shoe sole and shaft are prepared;
 b) the shaft is provided on the shaft-end area on the sole side with a waterproof and water-vapor-permeable shaft-bottom functional layer;
 c) the composite shoe sole and the shaft-end area provided on the sole side with the shaft-bottom functional layer are joined to each other in such a way that the shaft-bottom functional layer remains unconnected to the shaft-reinforcement material, at least in the area of the at least one through hole.

49. A method according to claim 48, in which the shaft-end area on the sole side is closed with the shaft-bottom functional layer.

50. A method according to claim 48, for the production of footwear, of which the shaft is provided with a shaft functional layer, whereby a waterproof connection is produced between the shaft functional layer and the shaft-bottom functional layer.

* * * * *

UNITED STATES PATENT AND TRADEMARK OFFICE
CERTIFICATE OF CORRECTION

PATENT NO. : 8,312,644 B2
APPLICATION NO. : 12/281510
DATED : November 20, 2012
INVENTOR(S) : Marc Peikert et al.

It is certified that error appears in the above-identified patent and that said Letters Patent is hereby corrected as shown below:

At column 39, under Men's shoe size 42/43 (French) table, subheading Water-vapor permeability of the shoe bottom structure: change "4.3 - 3.1= 0.9" to "4.3 - 3.1 = 1.2".

Signed and Sealed this
Fifth Day of February, 2013

Teresa Stanek Rea
*Acting Director of the United States Patent and Trademark Office*